US012462628B2

(12) United States Patent
Gomyo et al.

(10) Patent No.: US 12,462,628 B2
(45) Date of Patent: Nov. 4, 2025

(54) EQUIPMENT SERVER, DEVICE SERVER, AND COMMUNICATION SYSTEM

(71) Applicant: Mitsubishi Electric Corporation, Tokyo (JP)

(72) Inventors: Seiji Gomyo, Tokyo (JP); Yoshio Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 18/292,935

(22) PCT Filed: Aug. 31, 2021

(86) PCT No.: PCT/JP2021/031838
§ 371 (c)(1),
(2) Date: Jan. 29, 2024

(87) PCT Pub. No.: WO2023/032020
PCT Pub. Date: Mar. 9, 2023

(65) Prior Publication Data
US 2024/0362964 A1 Oct. 31, 2024

(51) Int. Cl.
*G07C 9/27* (2020.01)
*G07C 9/10* (2020.01)

(52) U.S. Cl.
CPC .................................... *G07C 9/27* (2020.01); *G07C 9/10* (2020.01)

(58) Field of Classification Search
CPC ......... G07C 9/27; G07C 9/10; G07C 9/00571
See application file for complete search history.

(56) References Cited

U.S. PATENT DOCUMENTS

2003/0043018 A1 3/2003 Gerstenkorn
2007/0122011 A1 5/2007 Takizawa
(Continued)

FOREIGN PATENT DOCUMENTS

CN 109573754 A 4/2019
CN 110203783 A 9/2019
(Continued)

OTHER PUBLICATIONS

Okazaki et al., "A cooperative control system of multiple M2M devices", Proceedings of The 76th National Convention of The Information Processing Society of Japan, 2014, 3 pages including Partial English Translation.
(Continued)

*Primary Examiner* — Nabil H Syed
(74) *Attorney, Agent, or Firm* — XSENSUS LLP

(57) ABSTRACT

In a communication system 1, a first communication unit 12 of an equipment server 10 communicates messages in a common data format with plural device servers 11. A equipment control unit 13 controls the access control system 6 including one or more passage restriction units 7, based on the message received by the first communication unit 12. The passage restriction units 7 are provided in the building 2 so as to be capable of restricting passage of plural devices 3. The device server 11 transmits the message to the equipment server 10 when the device 3 passes through a place where the passage restriction unit 7 is provided. The equipment control unit 13 determines whether or not the message is invalid based on the message received by the first communication unit 12. The equipment control unit 13 outputs an authentication request to the access control system 6.

36 Claims, 10 Drawing Sheets

(56) References Cited

U.S. PATENT DOCUMENTS

| | | | |
|---|---|---|---|
| 2012/0041593 A1 | 2/2012 | Ichinose et al. | |
| 2017/0353326 A1 | 12/2017 | Hashiura et al. | |
| 2019/0025855 A1 | 1/2019 | Matsuda et al. | |
| 2019/0229945 A1 | 7/2019 | Suyama | |
| 2019/0375609 A1 | 12/2019 | Hosokawa et al. | |
| 2020/0198620 A1 | 6/2020 | Nakata | |
| 2021/0387829 A1 | 12/2021 | Min et al. | |
| 2022/0108576 A1 | 4/2022 | Ozono et al. | |
| 2023/0040980 A1* | 2/2023 | Kamasaka | B66B 1/468 |

FOREIGN PATENT DOCUMENTS

| | | | | |
|---|---|---|---|---|
| CN | 110342356 A | 10/2019 | | |
| EP | 1378477 A1 | 1/2004 | | |
| JP | H05-286653 A | 11/1993 | | |
| JP | 2001-158578 A | 6/2001 | | |
| JP | 2002-316778 A | 10/2002 | | |
| JP | 2003-118945 A | 4/2003 | | |
| JP | 2003-221173 A | 8/2003 | | |
| JP | 2004-149251 A | 5/2004 | | |
| JP | 2004-265232 A | 9/2004 | | |
| JP | 2005-053670 A | 3/2005 | | |
| JP | 2005-053671 A | 3/2005 | | |
| JP | 2006-089262 A | 4/2006 | | |
| JP | 2007-148987 A | 6/2007 | | |
| JP | 2007-210801 A | 8/2007 | | |
| JP | 2010-023959 A | 2/2010 | | |
| JP | 2011-064344 A | 3/2011 | | |
| JP | 2012-017184 A | 1/2012 | | |
| JP | 2012-018646 A | 1/2012 | | |
| JP | 2012-118592 A | 6/2012 | | |
| JP | 2012-215925 A | 11/2012 | | |
| JP | 2014-030088 A | 2/2014 | | |
| JP | 2014214477 A | * | 11/2014 | E05B 49/00 |
| JP | 2016-134758 A | 7/2016 | | |
| JP | 2017-027499 A | 2/2017 | | |
| JP | 2017-088392 A | 5/2017 | | |
| JP | 2018-124679 A | 8/2018 | | |
| JP | 6452905 B1 | 1/2019 | | |
| JP | 2019-021162 A | 2/2019 | | |
| JP | 2019-026067 A | 2/2019 | | |
| JP | 2019-099327 A | 6/2019 | | |
| JP | 2019-120015 A | 7/2019 | | |
| JP | 2019-129407 A | 8/2019 | | |
| JP | 6649663 B1 | 2/2020 | | |
| JP | 2020-144447 A | 9/2020 | | |
| JP | 6887963 B2 | * | 6/2021 | B25J 9/1694 |
| WO | 2007/052346 A1 | 5/2007 | | |
| WO | 2018/016022 A1 | 1/2018 | | |
| WO | 2018/179600 A1 | 10/2018 | | |
| WO | 2018/193553 A1 | 10/2018 | | |

OTHER PUBLICATIONS

International Search Report mailed on Nov. 30, 2021, received for PCT Application PCT/JP2021/031838, filed on Aug. 31, 2021, 05 pages including English Translation.

* cited by examiner

Fig. 5

| TOPIC LAYER | CONTENT REPRESENTED BY EACH TOPIC LAYER | MEANING OF EACH TOPIC LAYER AND TOPIC NAME |
|---|---|---|
| 1 | DEVICE TYPE | Ex.)<br>Robot, Mobility,<br>Person, Elevator, etc. |
| 2 | DEVICE ID | NUMBER UNIQUE TO DEVICE<br>Ex.)<br>0001, etc. |
| 3 | MESSAGE TYPE | MESSAGE TRANSMISSION DIRECTION AND QoS LEVEL<br>Ex.)<br>O2B_Q0:<br>Message with QoS of 0<br>from device side to equipment side<br>O2B_Q1:<br>Message with QoS of 1<br>from device side to equipment side<br>B2O_Q0:<br>Message with QoS of 0<br>from equipment side to device side<br>B2O_Q1:<br>Message with QoS of 1<br>from equipment side to device side |
| 4 | FUNCTION TYPE | FUNCTION TYPE NAME<br>Ex.)<br>UserManagement,<br>MovingObjectLocalization,<br>SecurityInterface, etc. |

EQUIPMENT SERVER, DEVICE SERVER, AND COMMUNICATION SYSTEM

CROSS-REFERENCE TO RELATED APPLICATION

This application is based on PCT filing PCT/JP2021/031838, filed Aug. 31, 2021, the entire contents of which are incorporated herein by reference.

TECHNICAL FIELD

The present disclosure relates to an equipment server, a device server, a communication system, and a data structure.

BACKGROUND ART

PTL 1 discloses an example of an access control system. In the system, a portable terminal carried by a user transmits, by wireless communication, specification information specifying the user to an authentication apparatus provided at a door.

PRIOR ART

Patent Literature

[PTL 1] JP 2019-120015 A

SUMMARY OF THE INVENTION

Problems to be Solved by the Invention

Here, in a facility such as a building, plural kinds of devices may operate, the plural kinds of devices including a device such as a portable terminal or a wireless tag which moves while being carried by a user and a movable device such as a robot or a mobility device. In this case, in an access control system of PTL 1, when the plural devices operate in the facility such as a building, a format of communication with the access control system has to be defined for each of kinds of the plural devices. Thus, cooperation between the access control system and the devices moving in the facility is not easy.

The present disclosure relates to solutions for such problems. The present disclosure provides a communication system with which an access control system applied to a facility and devices moving in the facility easily cooperate, an equipment server and a device server in the communication system, and a data structure to be communicated in the communication system.

Means to Solve the Problem

An equipment server according to the present disclosure includes: a first communication unit that communicates a message in a common data format with plural device servers which communicate a control signal with at least any one device among plural devices moving in a facility; and an equipment control unit that controls equipment in the facility based on a message which is received by the first communication unit, wherein when a passing device among the plural devices, the passing device communicating a control signal with a passing device server which is any one of the plural device servers, passes through a place where a target passage restriction unit is provided, the target passage restriction unit being one of one or more passage restriction units which are provided in the facility so as to be capable of restricting passage of the plural devices, the equipment control unit determines whether or not a passage message is invalid based on the passage message, which is the message received by the first communication unit, and outputs a result of the determination to an access control system which includes the one or more passage restriction units.

A device server according to the present disclosure includes: a second communication unit that communicates a message in a common data format with an equipment server communicating with an access control system including one or more passage restriction units which are provided in a facility so as to be capable of restricting passage of plural devices moving in the facility, the equipment server controlling the access control system; and a device control unit that communicates a control signal with a passing device which is any one of the plural devices based on a message received by the second communication unit, wherein in a case where the passing device passes through a place where a target passage restriction unit as one of the one or more passage restriction units is provided, the second communication unit transmits a passage message which is a message to the equipment server such that the equipment server is capable of outputting a result of a determination about whether or not the passage message is invalid based on the passage message to the access control system.

A communication system according to the present disclosure includes: an equipment server; and plural device servers, wherein the equipment server includes a first communication unit that communicates a message in a common data format with the plural device servers and an equipment control unit that communicates with an access control system including one or more passage restriction units which are provided in a facility so as to be capable of restricting passage of plural devices moving in the facility and that controls the access control system, each of the plural device servers includes a second communication unit that communicates a message in the data format with the equipment server and a device control unit that communicates a control signal with at least any device of the plural devices, in a passing device server among the plural device servers which communicates a control signal with a passing device as any one of the plural devices, the second communication unit transmits a passage message which is a message to the equipment server in a case where the passing device passes through a place where a target passage restriction unit as one of the one or more passage restriction units is provided, and when the first communication unit receives the passage message from the passing device server, the equipment control unit determines whether or not the passage message is invalid based on the passage message and outputs a result of the determination to the access control system.

A data structure according to the present disclosure is a data structure of a message that is communicated in a common data format between plural device servers, the plural device servers communicating a control signal with at least any device among plural devices moving in a facility, and an equipment server, the equipment server communicating with an access control system including one or more passage restriction units which are provided in the facility so as to be capable of restricting passage of the plural devices, the equipment server controlling the access control system, and the data structure includes device specification information specifying a passing device, the device specification information being used for a determination about whether or not a message is invalid, the message being transmitted from a passing device server which communicates a control signal with the passing device to the equipment server in a case where the passing device as any one of the plural devices passes through a place where a target passage restriction unit as one of the one or more passage restriction units is provided.

Advantageous Effects of the Invention

An equipment server, a device server, or a communication system according to the present disclosure enables an access control system applied to a facility and devices moving in the facility to easily cooperate. Further, a data structure according to the present disclosure enables the access control system applied to the facility and the devices moving in the facility to easily cooperate.

BRIEF DESCRIPTION OF DRAWINGS

FIG. 5 is a diagram illustrating an example of a structure of the topic name of the message in the communication system according to the first embodiment.

DESCRIPTION OF EMBODIMENTS

Figure 1:
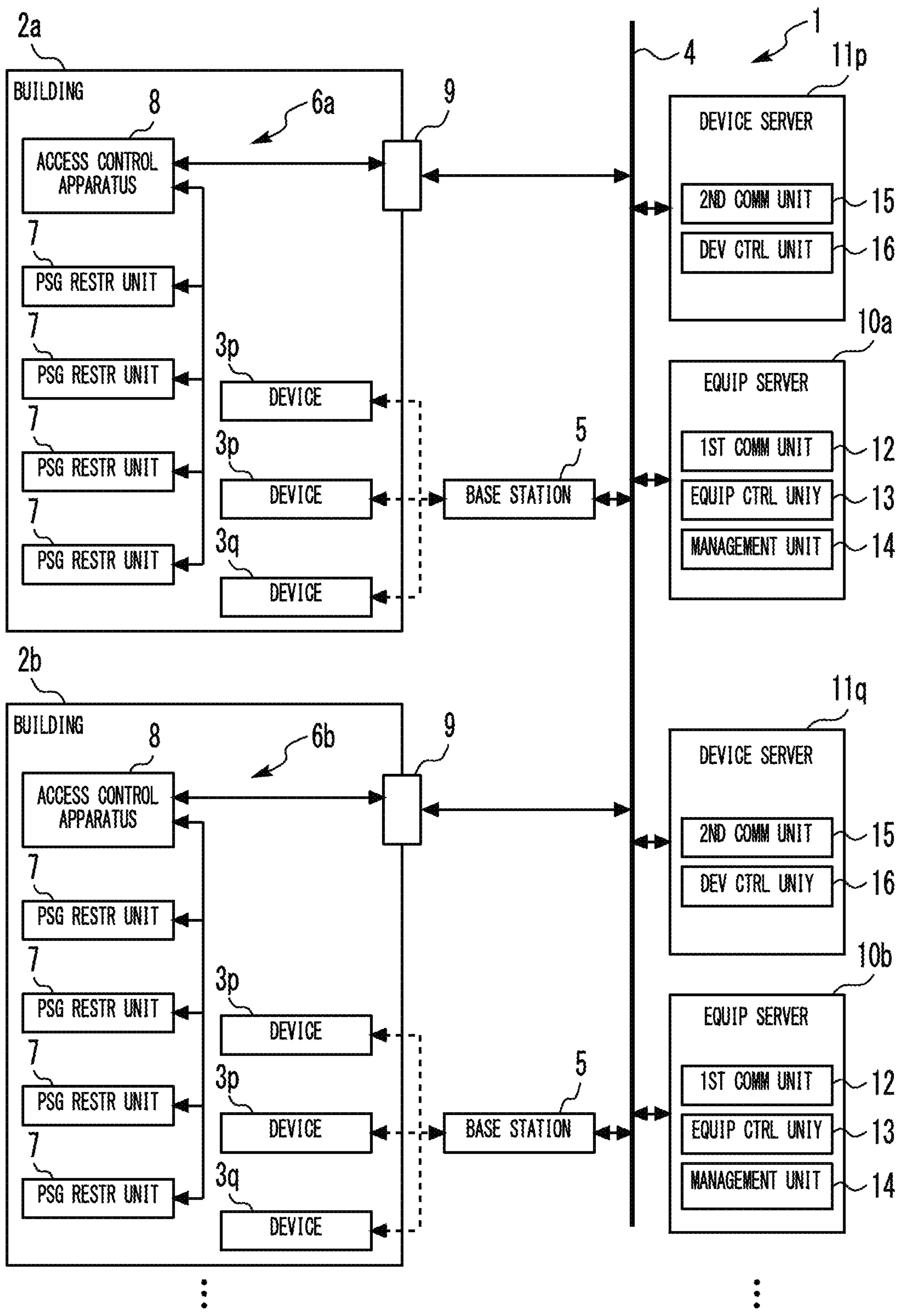
FIG. 1 is a configuration diagram of a communication system according to a first embodiment.

Modes for carrying out targets of the present disclosure will be described with reference to the attached drawings. The same reference characters are given to the same or corresponding portions in each of the drawings, and duplicate descriptions thereof will appropriately be simplified or will not be made. Note that the targets of the present disclosure are not limited to the following embodiments, and modification, addition, omission, and so forth of arbitrary configuration elements of embodiments are possible without departing from the scope of the gist of the present disclosure.

First Embodiment

FIG. 1 is a configuration diagram of a communication system 1 according to a first embodiment.

The communication system 1 is a system which is applied to communication for cooperation between plural pieces of equipment and plural devices in a facility. The plural pieces of equipment include systems, apparatuses, or the like, which operate in the facility, such as an access control system, for example.

In this example, the facility is a construction such as a building 2*a* or a building 2*b*, for example. Here, a building 2 is an expression in a case where the building 2*a*, the building 2*b*, and so forth are not distinguished.

The plural devices include plural devices 3*p* manufactured by a manufacturer p and plural devices 3*q* manufactured by a manufacturer q, for example. Here, a device 3 is an expression in a case where the device 3*p*, the device 3*q*, and so forth are not distinguished. Each device 3 moves in the facility such as the building 2. Here, the device 3 is a robot which autonomously moves in the building 2, a mobility device which moves in the building 2 autonomously or by a manipulation by a user, or the like, for example. It is sufficient that the robot is a robot which moves in the facility, and the robot may be a traveling robot which moves by wheels or a walking robot which moves by legs, for example. The robot may have an arm or the like for performing opening, closing, and so forth of a door provided in the facility. Alternatively, the device 3 is a wireless tag, a portable terminal, or the like which moves in the building 2 while being carried by a user of the building 2, for example. Alternatively, the device 3 is an elevator or the like which includes a car moving in an up-down direction in the building 2, for example.

In this example, a part of the plural devices 3*p* move in the building 2*a*. The other part of the plural devices 3*p* move in the building 2*b*. Further, a part of the plural devices 3*q* move in the building 2*a*. The other part of the plural devices 3*q* move in the building 2*b*. Each of the devices 3 is connected with a communication network 4 such as the Internet or a telephone line network, for example, by wireless communication. Each of the devices 3 is connected with the communication network 4 by a standard of wireless communication such as LTE (Long Term Evolution), for example. Each of the devices 3 may be connected with the communication network 4 via a base station 5, for example.

In the building 2*a*, an access control system 6*a* as an example of the equipment is applied. In the building 2*b*, an access control system 6*b* as an example of the equipment is applied. Here, an access control system 6 is an expression in a case where the access control system 6*a*, the access control system 6*b*, and so forth are not distinguished. The access control system 6 is a system which performs management about entry to and exit from one or plural regions in the facility to which the access control system 6 is applied. A region in the facility is a room or the like in the facility, for example.

Each access control system 6 includes one or more passage restriction units 7 and an access control apparatus 8. Each of the passage restriction units 7 is provided so as to be capable of restricting movement of the device 3 in the facility such as the building 2 to which the access control system 6 is applied. In the facility in this example, plural passage restriction units 7 are provided. Note that only one passage restriction unit 7 may be provided in the facility. The passage restriction unit 7 is a security automatic door, a security gate, an electronic lock, or the like, for example. A door in which the electronic lock is provided in the building 2 may not be an automatic door which is automatically opened and closed. The passage restriction unit 7 is provided at an entrance or the like of a region for which the access control system 6 performs management about entry and exit, for example. In this example, the passage restriction unit 7 restricts movement of the device 3 which passes through a place where the passage restriction unit 7 is provided. The passage restriction unit 7 physically restricts movement of the device 3 by closure of a door or a gate, locking of an electronic lock, or the like, for example. The access control apparatus 8 is an apparatus which performs control of the plural passage restriction units 7. Control by the access control apparatus 8 includes restriction of passage by each of the passage restriction unit 7, cancellation of the restriction, and so forth, for example. The access control apparatus 8 is connected with the communication network 4. The access control apparatus 8 provided in the building 2 may be connected with the communication network 4 via a communication apparatus 9 provided in the building 2, for example. The communication apparatus 9 may perform a process such as conversion of a communication protocol, for example.

The communication system 1 includes one or more equipment servers. In this example, one or more equipment servers include an equipment server 10*a* which corresponds to equipment operating in the building 2*a* and an equipment server 10*b* which corresponds to equipment operating in the building 2*b*. Here, an equipment server 10 is an expression in a case where the equipment server 10*a*, the equipment server 10*b*, and so forth are not distinguished. Each equipment server 10 is connected with the communication network 4. The equipment server 10*a* controls equipment which operates in the building 2*a* and which includes the access control system 6*a*. The equipment server 10*b* controls equipment which operates in the building 2*b* and which includes the access control system 6*b*. Each of the equipment servers 10 is a system which includes one or plural server apparatuses and so forth, for example. A part or all of functions of each of the equipment servers 10 may be implemented by resources or the like for storages or processes on a cloud service. Alternatively, each of the equipment servers 10 may be an edge server or the like in the building 2 in which the corresponding equipment operates, for example.

The communication system 1 includes plural device servers. In this example, the plural device servers include a device server 11*p* and a device server 11*q* which are managed by mutually different managers. Here, a device server 11 is an expression in a case where the device server 11*p*, the device server 11*q*, and so forth are not distinguished. The manager of the device server 11 is a manufacturer of the device 3, a management agent of the device 3, or the like, for example. The manager of the device server 11*p* is the manufacturer p, for example. The manager of the device server 11*q* is the manufacturer q, for example. Note that the same manager may manage plural device servers 11. Each of the device servers 11 is connected with the communication network 4. Each of the device servers 11 controls movement of each of the devices 3 through the communication network 4. The device servers 11*p* controls movement of each of the devices 3*p*. The device servers 11*q* controls movement of each of the devices 3*q*. Each of the device servers 11 is a system which includes one or plural server apparatuses and so forth, for example. A part or all of functions of each of the device servers 11 may be implemented by resources or the like for storages or processes on a cloud service.

In the communication system 1, a message is communicated between the equipment server 10 and the device server 11. In this example, the message is communicated by an MQTT (Message Queuing Telemetry Transport) protocol. In the MQTT protocol, a message is communicated between an MQTT broker and an MQTT client. The MQTT broker receives a message which the MQTT client publishes while designating a topic. In a case where a message of a topic subscribed to by the MQTT client is published, the MQTT broker transmits the message to the MQTT client. Note that the equipment server 10 and the device server 11 may perform communication of a message by another protocol than the MQTT. For example, communication of a message may be performed by using a protocol such as an HTTP (HyperText Transfer Protocol). In the present embodiment, a description will be made about a case where the MQTT protocol is used.

The equipment server 10 and the device server 11 communicate with each other by a common data format described later. In this example, the device server 11 and the device 3 controlled by the device server 11 communicate with each other by a data format different from the common data format. The equipment server 10 and the equipment controlled by the equipment server 10 may communicate with each other by the common data format or may communicate with each other by a data format different from the common data format. In this example, communication between the equipment such as the access control system 6 and the device 3 is performed via the equipment server 10 and the device server 11.

The message communicated in the communication system 1 includes a header and a payload. The header is a portion which includes control information of communication such as a keepalive timer and a topic name. The keepalive timer indicates a maximum time of an interval of the message to be received from the MQTT client. In this example, an upper limit of the keepalive timer is set to 20 minutes, for example. In a case where communication by the MQTT does not occur while a time 1.5 times the set time is elapsing, the keepalive timer expires, and connection by the MQTT is disconnected. In a case where the keepalive timer is not designated in the message at a time when connection is performed from the MQTT client or a case where the designated keepalive timer exceeds the upper limit, the MQTT broker sets the keepalive timer to an upper limit time, for example. The payload is a portion which includes information used for cooperation between the equipment such as the access control system 6 and the device 3. The message is used for control of a control target while the equipment such as the access control system 6 or the device 3 is set as the control target. The message has a data structure in a common format which is independent from kinds of the control targets.

The equipment server 10 includes a first communication unit 12, an equipment control unit 13, and a management unit 14.

The first communication unit 12 is a portion for communicating the message.

The first communication unit 12 is connected with each of the device servers 11 through the communication network 4. The first communication unit 12 is connected with each piece of the equipment to which the equipment server 10 corresponds through the communication network 4, for example. In this example, functions of the MQTT broker are installed in the first communication unit 12. In this case, functions of the MQTT client are installed in each of the device servers 11. When the first communication unit 12 receives the message published by any of the device servers 11, the first communication unit 12 outputs information included in the message to the equipment control unit 13.

The first communication unit 12 transmits and receives messages in the common data format to and from the plural device servers 11.

The equipment control unit 13 is a portion for controlling the corresponding equipment based on the message when the first communication unit 12 receives the message. Plural equipment control units 13 may be provided for each kind of the equipment, for example. The functions of the MQTT client may be installed in the equipment control unit 13. The equipment control unit 13 publishes a message to the device 3 in accordance with a situation of the equipment. The first communication unit 12 transmits the message to the device server 11 which subscribes to the topic of the message published by the equipment control unit 13.

The management unit 14 is a portion for managing the device 3 moving in the building 2 in which the equipment to which the equipment server 10 corresponds operates. The functions of the MQTT client may be installed in the management unit 14. The management unit 14 may manage the topics to which the device server 11 can subscribe, for example.

The device server 11 includes a second communication unit 15 and a device control unit 16.

The second communication unit 15 is a portion for communicating the message.

The second communication unit 15 is connected with each of the equipment servers 10 through the communication network 4. The second communication unit 15 is connected with each of the devices 3, movement of which the device servers 11 control, through the communication network 4. In this example, the functions of the MQTT client are installed in the second communication unit 15. When the second communication unit 15 receives a message with a topic to which the second communication unit 15 subscribes from any of the equipment servers 10, the second communication unit 15 outputs information included in the message to the device control unit 16. The second communication unit 15 communicates with the device 3 by a data format different from the common data format.

The device control unit 16 is a portion for communicating a control signal with the corresponding device 3 based on the message when the second communication unit 15 receives the message. The control signal is a signal such as a signal for controlling movement of a moving body in a case where the device 3 is a moving body such as a robot or a mobility device, for example. Alternatively, the control signal is a signal such as a signal for causing the device 3 to advise a user to move in a case where the device 3 is an article which moves by being carried by the user, such as a portable terminal or a wireless tag, for example. The device control unit 16 generates the control signal or the like to be communicated based on building information, for example. The building information is provided in advance from the equipment server 10 or the like, for example, when connection is performed by the device server 11 and the equipment server 10, for example. The building information includes map information of the building 2, target specification information which uniquely specifies each of the passage restriction units 7 provided in the building 2, and so forth. Plural device control units 16 may be provided for each of kinds of the devices 3. The device control unit 16 causes the second communication unit 15 to publish the message to the equipment in accordance with a situation of the device 3. The second communication unit 15 publishes the message to the first communication unit 12 of the equipment server 10 which controls the equipment.

An example of communication of the message in the communication system 1 will be described by raising, as an example, a case where the device 3*q* passes through a place where the passage restriction unit 7 of the access control system 6*a* is provided, in the building 2*a*. Here, the device 3*q* which passes through the place where the passage restriction unit 7 is provided is an example of a passing device. Further, the passage restriction unit 7 provided at the place through which the passing device passes is an example of a target passage restriction unit. The device server 11 which communicates the control signal with the passing device is an example of a passing device server. The message which is transmitted when the passing device passes through the place where the target passage restriction unit is provided is an example of a passage message. The passage message is a message which the passing device server transmits to the equipment server 10, for example. The device 3*q* requests the device server 11*q* to publish a message to the access control system 6*a*. The second communication unit 15 of the device server 11*q* publishes the requested message to the first communication unit 12 of the equipment server 10*a*.

In this example, the passage message includes device specification information which uniquely specifies the passing device. The passage message includes information which indicates a request for passage. In this example, the passage message includes target specification information which uniquely specifies the target passage restriction unit.

The equipment control unit 13 of the equipment server 10*a* obtains the message received by the first communication unit 12 based on the topic name, for example. The equipment control unit 13 controls the access control system 6*a* based on the obtained message. Based on the device specification information included in the obtained message, the equipment control unit 13 specifies the device 3*q*, which requests passage through the message, among the devices 3 moving in the building 2*a*. Based on the target specification information included in the obtained message, the equipment control unit 13 specifies the passage restriction unit 7 through which passage is requested through the message, among the plural passage restriction units 7 provided in the building 2*a*. Based on the device specification information, the target specification information, and so forth which are included in the obtained message, the equipment control unit 13 determines whether or not the message is invalid. The equipment control unit 13 outputs a result of the determination to the access control apparatus 8 of the access control system 6*a*.

Note that based on position information, in the building 2*a*, of the device 3*q* which requests passage through the message, the equipment control unit 13 may specify the passage restriction unit 7 through which passage is requested through the message, among the plural passage restriction units 7 provided in the building 2*a*. In this case, the position information of the device 3*q* is synchronized by periodic communication of the message, or the like, between the equipment control unit 13 and the device control unit 16. Based on the building information of the building 2*a*, the position information of the device 3*q*, and so forth, for example, the passage restriction unit 7 through which passage is requested is specified as the passage restriction unit 7 which is at a shortest distance from the device 3*q*, the passage restriction unit 7 which the device 3*q* faces, or the like. When the passage restriction unit 7 is specified by the position information of the device 3*q*, the passage message may not include the target specification information.

When the equipment control unit 13 determines that the message for requesting passage is invalid, the access control apparatus 8 of the access control system 6*a* restricts passage of the device 3*q* which requests passage by the message. The access control apparatus 8 causes the passage restriction unit 7 which is provided at the place through which the device 3*q* requests passage to maintain restriction of passage.

On the other hand, when the equipment control unit 13 determines that the message for requesting passage is valid, the access control apparatus 8 of the access control system 6*a* makes a determination about passage authorization of the device 3*q* which requests passage by the message. In the access control system 6*a* in this example, the device specification information which specifies the device 3 having the passage authorization for each of the passage restriction units 7 is registered in advance. The access control apparatus 8 collates the device specification information of the device 3 having the passage authorization for the passage restriction unit 7 through which passage is requested with the device specification information of the device 3*q* which requests passage and thereby makes a determination about the passage authorization of the device 3*q* which requests the passage. When the device specification information of the device 3*q* which requests passage is registered, the access control apparatus 8 causes the passage restriction unit 7 which is provided at the place through which the device 3*q* requests passage to cancel restriction of passage. When the device specification information of the device 3*q* which requests passage is not registered, the access control apparatus 8 causes the passage restriction unit 7 which is provided at the place through which the device 3*q* requests passage to maintain restriction of passage. The access control apparatus 8 outputs a result of the determination about the passage authorization to the equipment server 10.

The first communication unit 12 of the equipment server 10 publishes, to the second communication unit 15 of the device server 11*q*, the message, which indicates a result of control of the passage restriction unit 7 by the access control apparatus 8 of the access control system 6*a*, as the message of the topic to which the device server 11*q* subscribes. The message is a message such as a message which notifies to the device server 11*q* that passage is allowed or passage is not allowed, for example.

The second communication unit 15 of the device server 11*q* receives the message with the topic to which the second communication unit 15 subscribes. The device control unit 16 of the device server 11*q* obtains the message received by the second communication unit 15. The device control unit 16 transmits the control signal to the device 3*q* based on the obtained message. For example, in a case where the device 3*q* is a moving body which moves in the building 2*a*, the device 3*q* moves in the building 2*a* based on the transmitted control signal. Alternatively, when the device 3*q* is an article which moves by being carried by a user of the building 2*a*, the device 3*q* performs, to the user, a notification for advising the user to move in the building 2*a* based on the transmitted control signal. Here, the device 3*q* may perform the notification to the user by any of image information, character information, sound information, and so forth, for example.

Next, a description will be made about an example of a determination about invalidity of the message by the equipment control unit 13 by using FIG. 2 to FIG. 4.

Figure 2:
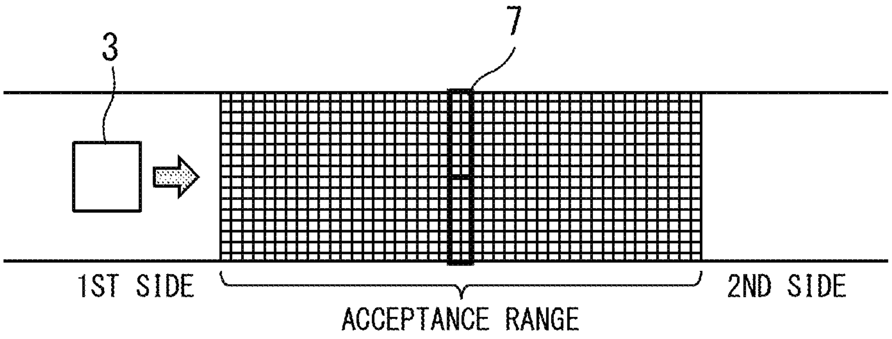
FIG. 2 is a example of a plan view of the building according to the first embodiment.
Figure 3:
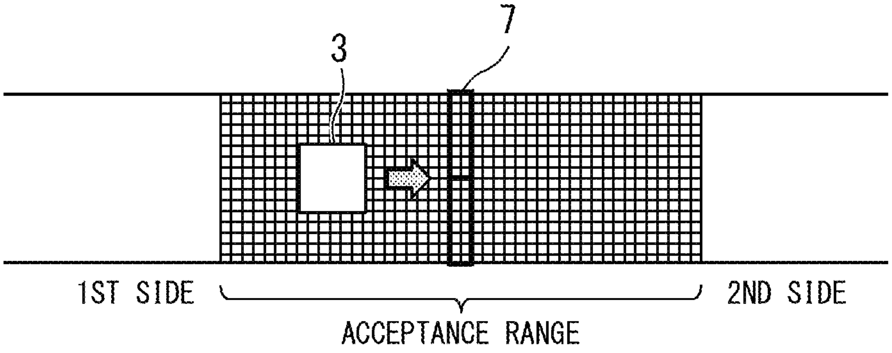
FIG. 3 is a example of a plan view of the building according to the first embodiment.
Figure 4:
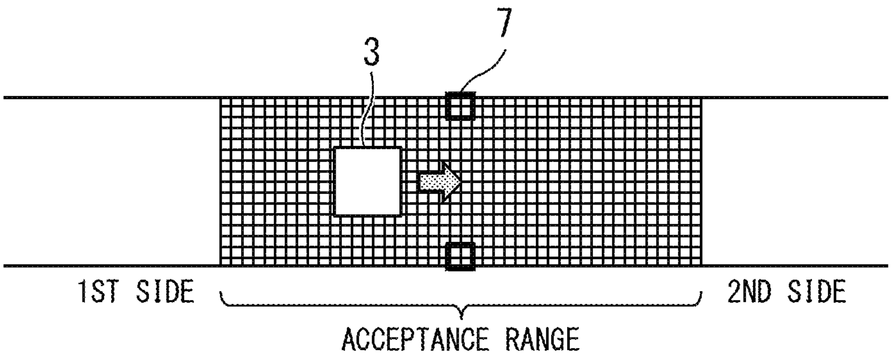
FIG. 4 is a example of a plan view of the building according to the first embodiment.

FIG. 2 to FIG. 4 are examples of a plan view of the building 2 according to the first embodiment.

FIG. 2 to FIG. 4 illustrate plan views of the place where the passage restriction unit 7 is provided. In this example, the device 3 as a moving body such as a robot or a mobility device is illustrated.

As illustrated in FIG. 2, the device 3 moves in the building 2 based on the control signal transmitted from the device server 11. The device 3 approaches the place where the passage restriction unit 7 is provided.

Here, in the access control system 6, an acceptance range which corresponds to each of the passage restriction units 7 is set in advance. The acceptance range is a range such as a range which includes a place where the corresponding passage restriction unit 7 is provided or a range in the vicinity of the place where the corresponding passage restriction unit 7 is provided, for example. In this example, the acceptance range is a range from a first side to a second side in a passage direction of the place where the passage restriction unit 7 is provided. Here, the first side and the second side of the passage restriction unit 7 represent mutually opposite sides in the passage direction relative to the place where the passage restriction unit 7 is provided. One of the first side and the second side represents an inner side of a region from and to which entry and exit are managed, for example. In this case, the other of the first side and the second side represents an outer side of the region.

As illustrated in FIG. 3, the moving device 3 enters the acceptance range which corresponds to the passage restriction unit 7. In this case, the device 3 requests the corresponding device server 11 to publish the message for requesting passage.

Based on the device specification information included in the obtained message, the equipment control unit 13 determines whether or not the message is invalid. For example, in a case where the device specification information included in the message is not registered in advance as the device specification information of the device 3 which is capable of passing through the building 2, the equipment control unit 13 determines that the message is invalid. On the other hand, in a case where the device specification information included in the message is registered in advance as the device specification information of the device 3 which is capable of passing through the building 2, the equipment control unit 13 makes a determination based on the position information of the device 3. In a case where a position of the device 3 which requests passage by the message is not included in the acceptance range of the passage restriction unit 7 provided at the place through which the device 3 requests passage, the equipment control unit 13 determines that the message is invalid. On the other hand, in a case where the position of the device 3 which requests passage by the message is included in the acceptance range of the passage restriction unit 7 provided at the place through which the device 3 requests passage, the equipment control unit 13 determines that the message is valid.

Subsequently, in a case where the access control apparatus 8 determines that the device 3 whose message for requesting passage is determined to be valid has the passage authorization, as illustrated in FIG. 4, restriction of passage by the passage restriction unit 7 is canceled. In a period resulting from this, the device 3 passes through the place where the passage restriction unit 7 is provided.

Next, a description will be made about a data structure of the message communicated in the communication system 1 by using FIG. 5.

FIG. 5 is a diagram illustrating an example of a structure of the topic name of the message in the communication system 1 according to the first embodiment.

As illustrated in FIG. 5, the topic name has a layered structure. In this example, the topic name is configured with four layers from a first layer at a highest rank to a fourth layer at a lowest rank. Note that the topic name may be configured with three or less layers or five or more layers.

The first layer indicates a device type. The device type is information which indicates a type of the device 3 such as a robot, a mobility device, a person, or an elevator, for example. Here, the device 3 whose device type is a person is the device 3 which moves by being carried by a person, for example.

A second layer indicates a device ID (IDentifier). The device ID is information for specifying the device 3. A value of the device ID is a number specific to the device 3 such as “0001”, for example. The device ID is an example of the device specification information.

A third layer indicates a message type. The message type includes information which indicates a transmission direction of the message. The transmission direction of the message is either one of from the device side to the equipment side and from the equipment side to the device side, for example. In this example, the transmission direction of the message does not individually specify a transmitter or a receiver of the message. The transmission direction from the device side to the equipment side is a transmission direction in which the message is transmitted from any of the device servers 11 to any of the equipment servers 10, for example. Further, the transmission direction from the equipment side to the device side is a transmission direction in which the message is transmitted from any of the equipment servers 10 to any of the device servers 11, for example. The message type is an example of direction information.

The message type may include information which indicates a QoS level (QoS: Quality of Service) of the message in the MQTT. The message at QoS level 0 is a message which is transmitted at most once from the MQTT broker and is with no delivery guarantee. The message at QoS level 1 is a message which is transmitted at least once from the MQTT broker and is with the delivery guarantee. A value of the message type is a character string, which is expressed by combining information of the transmission direction and the QoS level, such as “O2B_Q0”, for example. Here, a message type “O2B_Q0” indicates a message from the device side to the equipment side and at QoS level 0.

The fourth layer indicates a function type. The function type is information which indicates a type of a function which the control target is caused to execute. A value of the function type is a character string such as “UserManagement”, “MovingObjectLocalization”, or “SecurityInterface”, for example. In this example, a function type “UserManagement” indicates a type of a management function such as registering information of the device 3 moving in the building 2 in the management unit 14 of the equipment server 10. Further, a function type “MovingObjectLocalization” indicates a type of a function such as synchronization of a position state of the device 3. The function type includes update or the like of the position information stored in a memory of the equipment server 10, for example. Here, information of the position state of the device 3 includes information of a position and a state of the device 3, for example. Further, a function type “SecurityInterface” indicates a type of a function such as a request or a response to the access control system 6 as the equipment.

The message for requesting registration is transmitted from the device server 11. The message for requesting registration is transmitted from the device server 11 to the equipment server 10, for example, when the device server 11 communicates with the equipment server 10 for the first time. The information included in the payload of the message is described in a JSON format, for example. Data in the JSON format which are included in the payload of the message includes “api” or the like as a key.

A value of the key “api” indicates a name of an API (Application Programming Interface) to be used. Here, the message includes processing information. The processing information of the message is information which indicates a process related to the message. The processing information includes the value of the key “api”. The value of the key “api” is a character string such as “Registration” which indicates a request for registration, for example. The value of the key “api” is a character string such as “RegistrationResult” which indicates a notification about a result of registration, for example. The value of the key “api” is a character string such as “PositionSynchronization” which indicates a notification about the position state, for example. The value of the key “api” is a character string such as “PositionSynchronizationFromPF” which indicates a correction request about the position state, for example. The value of the key “api” is a character string such as “UnlockSecurity” which indicates a function of canceling security in the access control system 6, for example. The value of the key “api” is a character string such as “UnlockSecurityResult” which indicates a function of notifying a result of cancellation of security in the access control system 6, for example. The value of the key “api” is a character string such as “UsedStatusOfSecurity” which indicates a function of notifying a passage situation of the device 3 in the place where the passage restriction unit 7 is provided, for example. The value of the key “api” is a character string such as “RequestFromSecurity” which indicates a function for a request about security to the device 3, for example.

Next, a description will be made about an example of an action of the communication system 1 by using FIG. 6 to FIG. 10.

FIG. 6 to FIG. 10 are sequence diagrams illustrating an example of the action of the communication system 1 according to the first embodiment.

Figure 6:
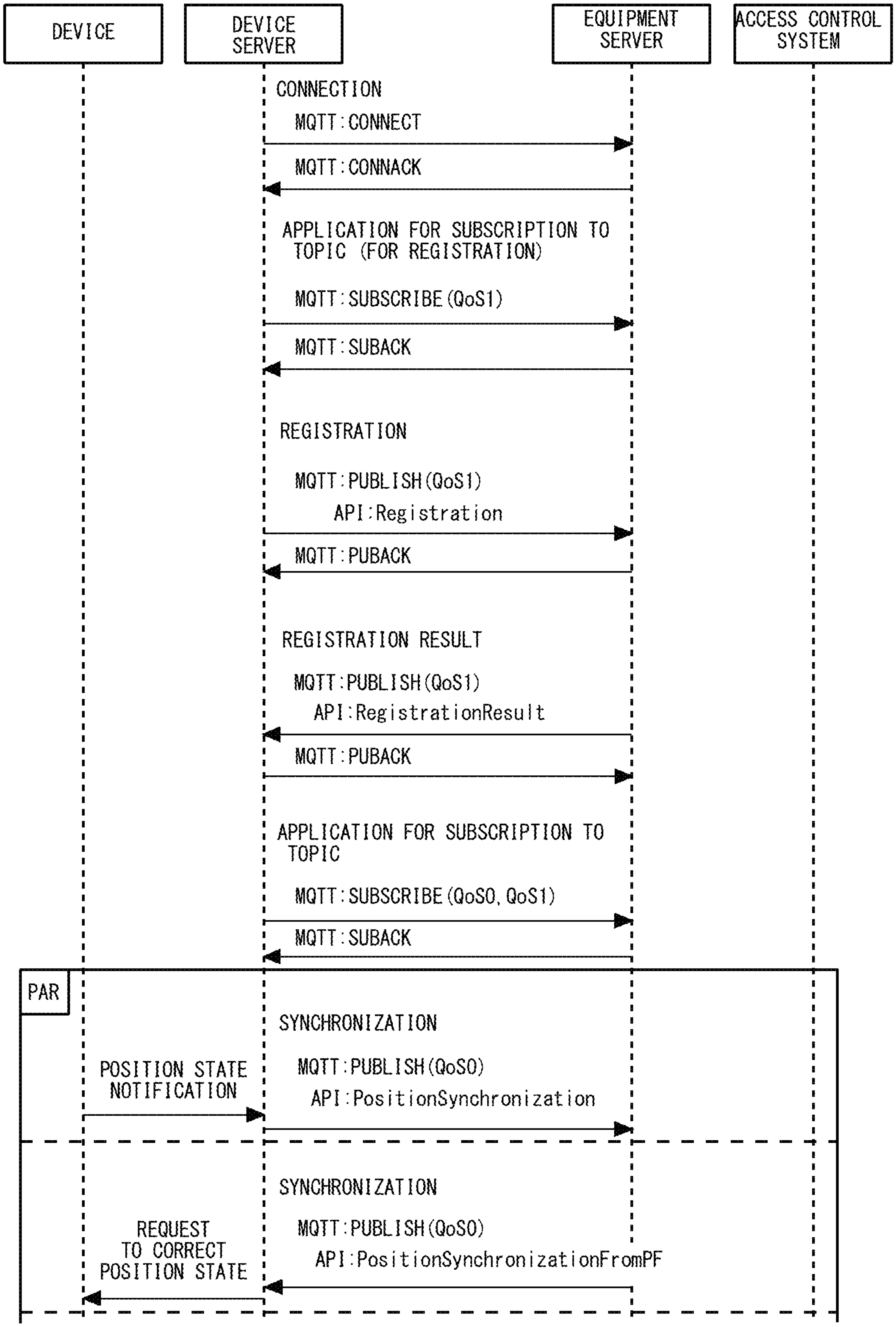
FIG. 6 is a sequence diagram illustrating an example of the action of the communication system according to the first embodiment.

FIG. 6 illustrates a sequence diagram in initial registration and an ordinary action which is thereafter performed. In this example, an example of an action will be illustrated in which the device 3 is registered in the management unit 14 of the equipment server 10.

In order to register the device 3 moving in the building 2, the device server 11 is connected with the equipment server 10 which corresponds to the equipment operating in the building 2. Connection with the equipment server 10 is performed based on a manipulation of the device server 11 by a manager of the device 3, for example. Alternatively, connection with the equipment server 10 may be performed, via the device server 11, based on a manipulation of the device 3 by the manager of the device 3, for example.

The second communication unit 15 of the device server 11 transmits a CONNECT message of the MQTT to the first communication unit 12 of the equipment server 10. The first communication unit 12 of the equipment server 10 returns a CONNACK message of the MQTT to the second communication unit 15 of the device server 11. Accordingly, the device server 11 confirms that connection with the equipment server 10 by the MQTT is established. Here, communication between the device server 11 and the equipment server 10 is communication such as secure communication using a server certificate and a client certificate, for example.

The second communication unit 15 of the device server 11 transmits a SUBSCRIBE message of the MQTT to the first communication unit 12 of the equipment server 10 at QoS level 1 such that a topic for registering the device 3 is subscribed to. The first communication unit 12 of the equipment server 10 returns a SUBACK message of the MQTT to the second communication unit 15 of the device server 11. Accordingly, the device server 11 confirms that subscription of the topic is permitted.

The second communication unit 15 of the device server 11 transmits a PUBLISH message of the MQTT, the PUBLISH message including information of the device 3 to be registered in the payload, to the first communication unit 12 of the equipment server 10 at QoS level 1. In the message, "Registration" is designated as the API. The message is published as a message which is configured to include first layer: NULL, second layer (device specification information): NULL, third layer (direction information): O2B, and fourth layer: UserManagement in the topic name and to include API (processing information): Registration in the payload, for example. The first communication unit 12 of the equipment server 10 returns a PUBACK message of the MQTT to the second communication unit 15 of the device server 11. Accordingly, the device server 11 confirms that publication of the message is accepted.

Based on the message received from the device server 11 by the first communication unit 12, the management unit 14 of the equipment server 10 performs processes for registration of the device 3 such as addition of the device ID and generation of a topic header. The management unit 14 notifies a result of the registration to the first communication unit 12. In this example, the management unit 14 publishes, to the first communication unit 12, the PUBLISH message of the MQTT, which includes information of the generated topic header in the payload, as the message at QoS level 1. In the message, "RegistrationResult" is designated as the API. The message is a message which is configured to include first layer: NULL, second layer (device specification information): NULL, third layer (direction information): O2B, and fourth layer: UserManagement in the topic name and to include API (processing information): RegistrationResult in the payload, for example.

Because the second communication unit 15 of the device server 11 subscribes to the topic, the second communication unit 15 receives the result of the registration as the PUBLISH message of the MQTT from the first communication unit 12 of the equipment server 10. The second communication unit 15 of the device server 11 returns the PUBACK message of the MQTT to the first communication unit 12 of the equipment server 10. Accordingly, the equipment server 10 confirms that the result of the registration is notified to the device server 11.

The second communication unit 15 of the device server 11 transmits the SUBSCRIBE message of the MQTT to the first communication unit 12 of the equipment server 10 such that the topic including the topic header notified in the result of the registration is subscribed to. The second communication unit 15 transmits the SUBSCRIBE message about the topic to the first communication unit 12 such that the message at QoS level 0 is subscribed to. Further, the second communication unit 15 transmits the SUBSCRIBE message about the topic to the first communication unit 12 such that the message at QoS level 1 is subscribed to. That is, the second communication unit 15 applies for subscription of the message to the device side, the message indicating an arbitrary function type. The first communication unit 12 of the equipment server 10 returns the SUBACK message of the MQTT to the second communication unit 15 of the device server 11. Accordingly, the device server 11 confirms that subscription of the topic for which the second communication unit 15 applies is permitted.

Here, the device server 11 may perform a change for the device 3 registered in the equipment server 10 by a similar process. The change for the registered device 3 includes update or deletion of registration contents, for example. For example, the second communication unit 15 transmits the PUBLISH message of the MQTT, the PUBLISH message including information of the device 3 for which the change is performed in the payload, to the first communication unit 12 of the equipment server 10 at QoS level 1. In the message, "Registration" is designated as the API. The message is published as a message which is configured to include first layer: NULL, second layer (device specification information): NULL, third layer (direction information): O2B, and fourth layer: UserManagement in the topic name and to include API (processing information): Registration in the payload, for example. Here, the payload includes information such as the device ID for specifying the device 3 as a target of the change. Further, in a case where update of the registration contents is performed, the payload includes information similar to information necessary for the initial registration.

Subsequently, based on the message received from the device server 11 by the first communication unit 12, the management unit 14 of the equipment server 10 performs a process for the change, such as update or deletion, in the registration contents of the device 3 specified by the device ID. The management unit 14 notifies a result of a change process to the first communication unit 12. The result of the change process includes information such as success of update or success of deletion, for example. In this example, the management unit 14 publishes, to the first communication unit 12, the PUBLISH message of the MQTT, which includes information of the generated topic header in the payload, as the message at QoS level 1. In the message, "RegistrationResult" is designated as the API. The message is a message which is configured to include first layer: NULL, second layer (device specification information): NULL, third layer (direction information): O2B, and fourth layer: UserManagement in the topic name and to include API (processing information): RegistrationResult in the payload, for example.

After the registration is performed as described above, communication between the device server 11 and the equipment server 10 transits to the ordinary action. The message from the device server 11 to the equipment server 10 is communicated as the PUBLISH message from the MQTT client as a publisher to the MQTT broker. The message from the equipment server 10 to the device server 11 is communicated as the PUBLISH message from the MQTT broker to the MQTT client as a subscriber of the topic. The device server 11 specifies the device 3 as a target of the message based on the topic header of the message.

Here, a difference between the position state of the device 3 which is recognized by the device 3 itself and the position state of the device 3 which is recognized by the equipment server 10 can be an obstacle to cooperation between the equipment such as the access control system 6 and the device 3. Thus, in the ordinary action, synchronization of the position states of the device 3 is performed between the device side and the equipment side. The synchronization of the position states is performed by periodic notifications about the position state from the device side to the equipment side, the correction request about the position state from the equipment side to the device side, and so forth, for example. Note that plural pieces of communication in the ordinary action which include the notification about the position state, the correction request about the position state, and so forth are performed by parallel processing as indicated by a combined fragment PAR in the sequence diagram, for example.

In the ordinary action, the message is transmitted from the device server 11 to the equipment server 10 such that the position state of the device 3 can be notified. The message is periodically transmitted in cycles which are set in advance, for example. The information of the position state of the device 3 is obtained from the device 3 by the device control unit 16, for example.

The message for notifying the position state includes, in the payload, the information of the position state of the device 3 as data in the JSON format, for example. The information of the position of the device 3 may include information of an orientation of the device 3, for example. The data included in the payload includes an API name which designates a function on the equipment side about the synchronization of the position state, the device ID which specifies the device 3 to be synchronized, information which designates a data expression of the position of the device 3, and so forth, for example. The API name is "PositionSynchronization" or the like, for example. The message for notifying the position state is configured to include first layer: Robot, second layer (device specification information): 001, third layer (direction information): O2B, and fourth layer: MovingObjectLocalization in the topic name and to include API (processing information): PositionSynchronization in the payload, for example. The data expression of the position of the device 3 is designated by a combination of a coordinate system, unit systems such as a length and an angle, and a data kind such as an integer, a real number, or a character string, for example. The coordinate system may be an absolute coordinate system which indicates an absolute position of the device 3 by a group of a latitude, a longitude, and an altitude and which indicates the orientation of the device 3 by a bearing, for example. Alternatively, the coordinate system may be a building coordinate system which indicates a building specific position of the device 3 in the building 2 by a group of orthogonal coordinates (x,y) specific to the building 2 and a floor and which indicates the orientation of the device 3 by an angle at the orthogonal coordinates specific to the building 2, for example. In this case, an origin in the building coordinate system may together be designated. The position state notified from the device 3 is managed by the management unit 14, for example.

The information of the position state of the device 3 may include information of an identifier which identifies a base point for designating a correction position of the device 3 in the correction request when correction of the position state of the device 3 is requested by the equipment server 10. In this case, the device server 11 transmits the message to the equipment server 10 while causing the message to include the identifier of the correction request which is accepted last and thereby prevents an occurrence of a deviation of the base point from the equipment server 10.

In a case where the device 3 is a moving body such as a robot or a mobility device, the information of the position state of the device 3 may include information which indicates a remaining charge amount of a battery for driving the device 3. The information of the position state of the device 3 may include information of an action state of the device 3, for example. The action state of the device 3 includes a state such as moving or waiting, for example. The information of the state of the device 3 may include information of operation contents of the device 3, for example. The information of the operation contents includes states such as during operation or no operation, for example.

Further, in the ordinary action, the message is transmitted from the equipment server 10 to the device server 11 such that correction of the position state of the device 3 can be requested. In the equipment server 10, the information of the position state of the device 3 is obtained by an observation apparatus such as a camera provided in the building 2, for example. The correction request about the position state is performed in a case where the difference between the position information of the device 3 which is recognized by the equipment server 10 and the position state notified from the device 3 itself becomes larger than a range which is set in advance, for example.

The message of the correction request about the position state includes, in the payload, information such as the base point as data in the JSON format, for example. The information of the base point may include information for correcting the orientation of the device 3, for example. The data included in the payload includes the API name which designates a function on the device side about the synchronization of the position state, the device ID which specifies the device 3 to be synchronized, information which designates a data expression of the base point, and so forth, for example. The API name is "PositionSynchronizationFromPF" or the like, for example. The message of the correction request about the position state is configured to include first layer: Robot, second layer (device specification information): 001, third layer (direction information): O2B, and fourth layer: MovingObjectLocalization in the topic name and to include API (processing information): PositionSynchronizationFromPF in the payload, for example. The data expression of the base point is designated similarly to the data expression of the position of the device 3, for example. The message of the correction request about the position state may include the information of the identifier which identifies the base point.

Based on the message of the correction request which is received from the equipment server 10, the device control unit 16 of the device server 11 causes the device 3 specified by the message to correct the position state.

Here, the message about the synchronization of the position states which is transmitted from the equipment server 10 to the device server 11 may include information which indicates whether or not correction of the position state is necessary. In a case where correction of the position state is not necessary, the message may not include the information of the base point. Further, the message may periodically be transmitted in cycles which are set in advance. Further, the message may include information for notifying a maintenance state of the equipment server 10.

Note that when no response is made from the equipment server 10, for example, the device server 11 detects disconnection of communication between the device server 11 and the equipment server 10. For example, in a case where although the device server 11 transmits the message for notifying the position state, the device server 11 does not receive the message of the correction request about the position state, the device server 11 determines that no response is made from the equipment server 10. As a cause of no response from the equipment server 10, for example, as well as abnormality in the communication network 4, a situation where the equipment server 10 temporarily stops a service and so forth may be raised. In a case where communication between the device server 11 and the equipment server 10 is disconnected, the device server 11 resumes communication by transmitting the CONNECT message to the equipment server 10 again. Further, in a case where the keepalive timer expires, the device server 11 resumes communication by transmitting the CONNECT message to the equipment server 10 again. In a case where connection by the MQTT is established but no response is made from the equipment server 10, the device server 11 performs the initial registration of the device 3 again. Here, in a case where information of the registration is retained in the equipment server 10, the device server 11 may skip the initial registration in reconnection. The information of the registration is retained for approximately one hour, for example.

Figure 7:
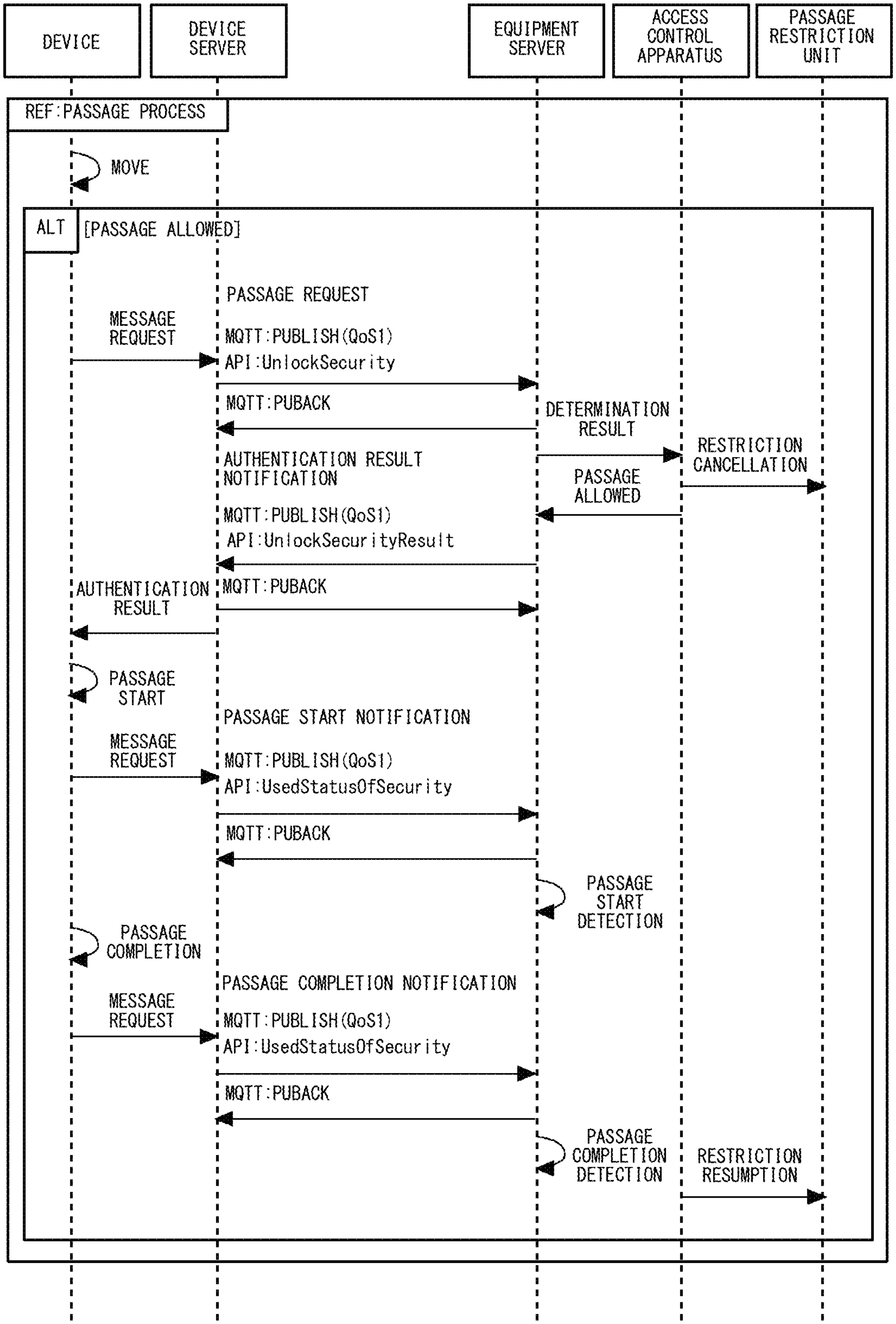
FIG. 7 is a sequence diagram illustrating an example of the action of the communication system according to the first embodiment.

FIG. 7 illustrates a sequence diagram of a case where the device 3 passes through the place where the passage restriction unit 7 is provided. FIG. 7 illustrates an example of a sequence diagram of a case where passage of the device 3 is normally completed.

The device 3 moves to the acceptance range of the passage restriction unit 7 provided in the building 2. Subsequently, the device 3 requests the corresponding device server 11 to publish the message for requesting passage through the place where the passage restriction unit 7 is provided.

The device server 11 which accepts the request transmits the message for requesting passage to the equipment server 10. The message for requesting passage includes information such as the API name for designating a function of canceling security, the device ID which specifies the device 3 performing passage, and a target ID which specifies the passage restriction unit 7 provided at the place through which passage is requested. The target ID is an example of the target specification information. The API name is "UnlockSecurity", or the like, for example. The message is configured to include first layer: Robot, second layer (device specification information): 001, third layer (direction information): O2B, and fourth layer: SecurityInterface in the topic name and to include API (processing information): UnlockSecurity in the payload, for example. In this example, the payload includes the target ID (target specification information) of the passage restriction unit 7, a security ID of the device 3, and information of a direction of entry or exit of the device 3. The security ID is information which uniquely specifies the device 3 in the access control system 6. The information of the direction of entry or exit includes information of either one of an entry to a region and an exit from a region, for example.

The equipment control unit 13 of the equipment server 10 which receives the message determines whether or not the message is invalid. The equipment control unit 13 outputs a result of the determination to the access control apparatus 8. In this case, the equipment control unit 13 outputs, together with the result of the determination, information such as the device ID, the security ID, the target ID, and the direction of entry or exit which are included in the message, for example, to the access control apparatus 8. For example, when it is determined that the message is valid, the equipment control unit 13 outputs the result of the determination as an authentication request about the device 3 to the access control apparatus 8.

The access control apparatus 8 makes a determination about the passage authorization of the device 3 which requests passage by the message. In the access control system 6 in this example, the security ID which specifies the device 3 having the passage authorization for each of the passage restriction units 7 is registered in advance. The access control apparatus 8 collates the security ID of the device 3 having the passage authorization for the passage restriction unit 7 through which passage is requested with the security ID of the device 3 which requests passage and thereby makes a determination about the passage authorization of the device 3 which requests the passage. When it is determined that the device 3 has the passage authorization, the access control apparatus 8 causes the passage restriction unit 7 through which passage is requested to cancel restriction of passage. The access control apparatus 8 outputs a result of the determination about the passage authorization as an authentication result to the equipment server 10. In this example, a determination result that the device 3 has the passage authorization is output to the equipment server 10. Here, the authentication result includes information such as the notification about the position state, contents of the authenticated request, or passage restriction cancellation propriety, for example. The notification about the position state includes information such as the device ID of the device 3, the position information of the device 3, the floor where the device 3 is present, and the state of the device 3, for example. The contents of the authenticated request include information such as the device ID of the device 3, the target ID of the passage restriction unit 7, and a classification of an entry-exit region, for example. Information of the passage restriction cancellation propriety includes information such as the device ID of the device 3 and a result of cancellation of the passage restriction, for example.

In a case where the authentication result is output from the access control system 6, the equipment server 10 transmits the message for notifying the authentication result to the device server 11. The message for notifying the authentication result includes the API name for designating a function of notifying the result of cancellation of security and information which indicates permission of passage, for example. The API name is "UnlockSecurityResult", or the like, for example. The message is configured to include first layer: Robot, second layer (device specification information): 001, third layer (direction information): B2O, and fourth layer: SecurityInterface in the topic name and to include API (processing information): UnlockSecurityResult in the payload, for example. In this example, information which indicates that passage is allowed is included in the payload.

The device control unit 16 transmits information of the notified authentication result to the device 3. Subsequently, the device 3 starts passage through the place where the passage restriction unit 7 is provided, the passage restriction unit 7 canceling restriction of passage. For example, in a case where the device 3 is a moving body such as a robot or a mobility device, the moving body starts passage based on the control signal from the device control unit 16. In a case where the device 3 is an article which moves by being carried by the user, such as a portable terminal or a wireless tag, the device 3 notifies the information of the authentication result to the user. The user who accepts the notification starts passage while carrying the device 3. When passage is started, the device 3 requests the corresponding device server 11 to publish the message for notifying a start of passage.

The device server 11 which accepts the request transmits the message for notifying the start of passage to the equipment server 10. The message for notifying the start of passage includes the API name for designating a function of notifying a passage situation, the device ID which specifies the device 3 performing passage, and information which indicates the start of passage as the passage situation. The API name is "UsedStatusOfSecurity", or the like, for example. The message is configured to include first layer:

Robot, second layer (device specification information): 001, third layer (direction information): O2B, and fourth layer: SecurityInterface in the topic name and to include API (processing information): UsedStatusOfSecurity in the payload, for example. Information of the passage situation is included in the payload, for example.

Based on information synchronized with the device server 11 such as the position state of the device 3, for example, the equipment server 10 detects the start of passage of the device 3 in the place where the passage restriction unit 7 is provided, the passage restriction unit 7 canceling restriction.

Subsequently, the device 3 completes passage through the place where the passage restriction unit 7 is provided, the passage restriction unit 7 canceling restriction of passage. When passage is completed, the device 3 requests the corresponding device server 11 to publish the message for notifying completion of passage.

The device server 11 which accepts the request transmits the message for notifying the completion of passage to the equipment server 10. The message for notifying the completion of passage includes the API name for designating the function of notifying the passage situation, the device ID which specifies the device 3 performing passage, and information which indicates the completion of passage as the passage situation. The API name is “UsedStatusOfSecurity”, or the like, for example. The message is configured to include first layer: Robot, second layer (device specification information): 001, third layer (direction information): O2B, and fourth layer: SecurityInterface in the topic name and to include API (processing information): UsedStatusOfSecurity in the payload, for example.

Based on the information synchronized with the device server 11 such as the position state of the device 3, for example, the equipment server 10 detects the completion of passage of the device 3 in the place where the passage restriction unit 7 is provided, the passage restriction unit 7 canceling restriction.

Subsequently, the equipment control unit 13 of the equipment server 10 causes the passage restriction unit 7, which has canceled restriction of passage, to resume restriction of passage.

Figure 8:
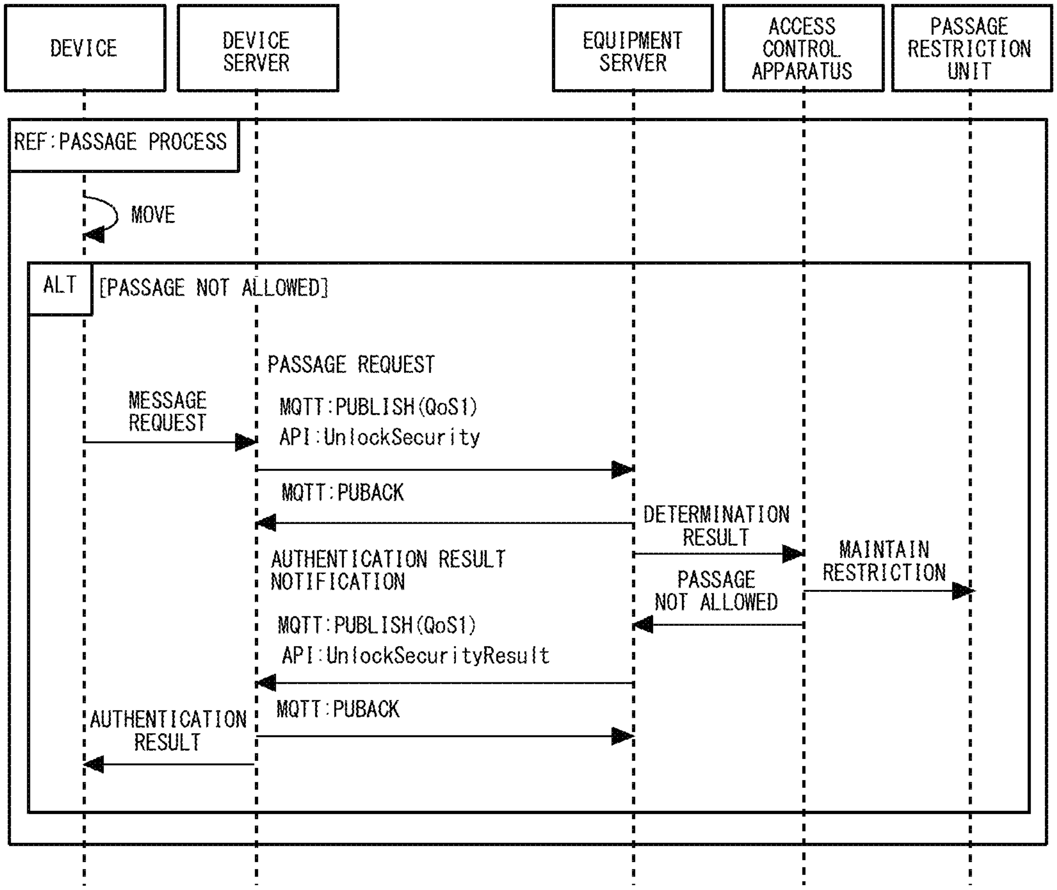
FIG. 8 is a sequence diagram illustrating an example of the action of the communication system according to the first embodiment.

FIG. 8 illustrates an example of a sequence diagram of a case where the device 3 cannot pass through the place where the passage restriction unit 7 is provided.

The access control apparatus 8 makes a determination about the passage authorization of the device 3 which requests passage by the message. When it is determined that the device 3 has no passage authorization, the access control apparatus 8 causes the passage restriction unit 7 through which passage is requested to maintain restriction of passage. Because the restriction of passage by the passage restriction unit 7 is maintained, the device 3 which requests passage does not pass through the place where the passage restriction unit 7 is provided. The access control apparatus 8 outputs the result of the determination about the passage authorization as the authentication result to the equipment server 10. In this example, a determination result that the device 3 has no passage authorization is output to the equipment server 10.

In a case where the authentication result is output from the access control system 6, the equipment server 10 transmits the message for notifying the authentication result to the device server 11. The message for notifying the authentication result includes the API name for designating the function of notifying the result of cancellation of security and the information which indicates permission of passage, for example. In this example, information which indicates that passage is not allowed is included in the payload.

Note that in a case where it is determined that the message from the device server 11 which requests passage is invalid, the equipment server 10 may skip an output of the result of the determination to the access control apparatus 8. In this case, the equipment server 10 transmits the message for notifying the authentication result to the device server 11 while the information which indicates that passage is not allowed is included in the payload.

In the message for notifying the authentication result, the payload may include information of a cause of the determination that passage is not allowed. As information of the cause, the payload includes information for discriminating an invalid request error, a temporary error, an authentication error, or the like. The invalid request error corresponds to a case where the message for requesting passage is invalid, for example.

For example, in a case where the passage restriction unit 7 specified by the target ID is not present in the building 2, a case where the position of the device 3 specified by the device ID is not present in the acceptance range of the passage restriction unit 7 specified by the target ID or the like, or a case where requests are successively made by the same device 3, the message for requesting passage is determined to be invalid. The temporary error corresponds to a communication error such as communication abnormality or expiration of a communication time, for example. Alternatively, the temporary error corresponds to a case where another device 3 is passing through the place where the passage restriction unit 7 is provided, the passage restriction unit 7 being specified by the target ID or the like, for example. The authentication error corresponds to a case where the access control system 6 determines that passage is not allowed, for example. For example, in a case where the access control system 6 determines that the device 3 has no passage authorization for the place where the passage restriction unit 7 is provided based on the security ID or a case where use of the passage restriction unit 7 is stopped for patrol in progress, an inspection in progress, a reason for security, or another reason, the access control system 6 determines that passage of the device 3 is not allowed.

Figure 9:
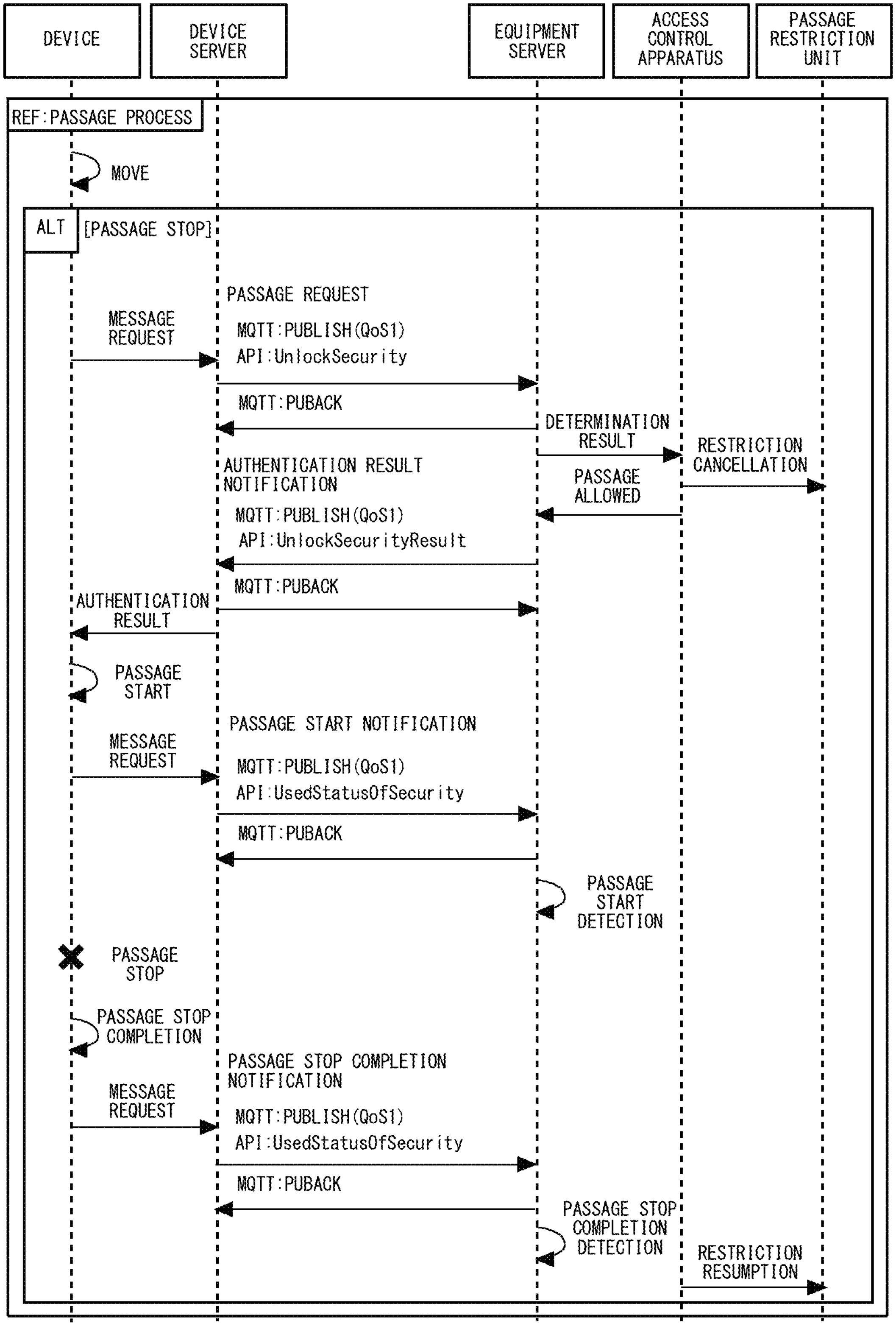
FIG. 9 is a sequence diagram illustrating an example of the action of the communication system according to the first embodiment.

FIG. 9 illustrates an example of a sequence diagram of a case where the device 3 stops passage through the place where the passage restriction unit 7 is provided.

The device 3 which receives the authentication result that passage is allowed starts passage through the place where the passage restriction unit 7 is provided, the passage restriction unit 7 canceling restriction of passage. Here, for example, in a case where the device 3 cannot perform passage due to an obstacle or the like which is present on a passage route of the device 3, the device 3 stops passage. The device 3 completes a stop of passage, for example, by moving to turn back to a position away from the place where the passage restriction unit 7 is provided. When the stop of passage is completed, the device 3 requests the corresponding device server 11 to publish the message for notifying completion of the stop of passage.

The device server 11 which accepts the request transmits the message for notifying the completion of the stop of passage to the equipment server 10. The message for notifying the completion of the stop of passage includes the API name for designating the function of notifying the passage situation, the device ID which specifies the device 3 performing passage, and information which indicates the completion of the stop of passage as the passage situation. The API name is “UsedStatusOfSecurity”, or the like, for example. The message is configured to include first layer: Robot, second layer (device specification information): 001, third layer (direction information): O2B, and fourth layer: SecurityInterface in the topic name and to include API (processing information): UsedStatusOfSecurity in the payload, for example.

Based on the information synchronized with the device server 11 such as the position state of the device 3, for example, the equipment server 10 detects the completion of the stop of passage by the device 3 in the place where the passage restriction unit 7 is provided, the passage restriction unit 7 canceling restriction.

Subsequently, the equipment control unit 13 of the equipment server 10 causes the passage restriction unit 7, which has canceled restriction of passage, to resume restriction of passage.

Figure 10:
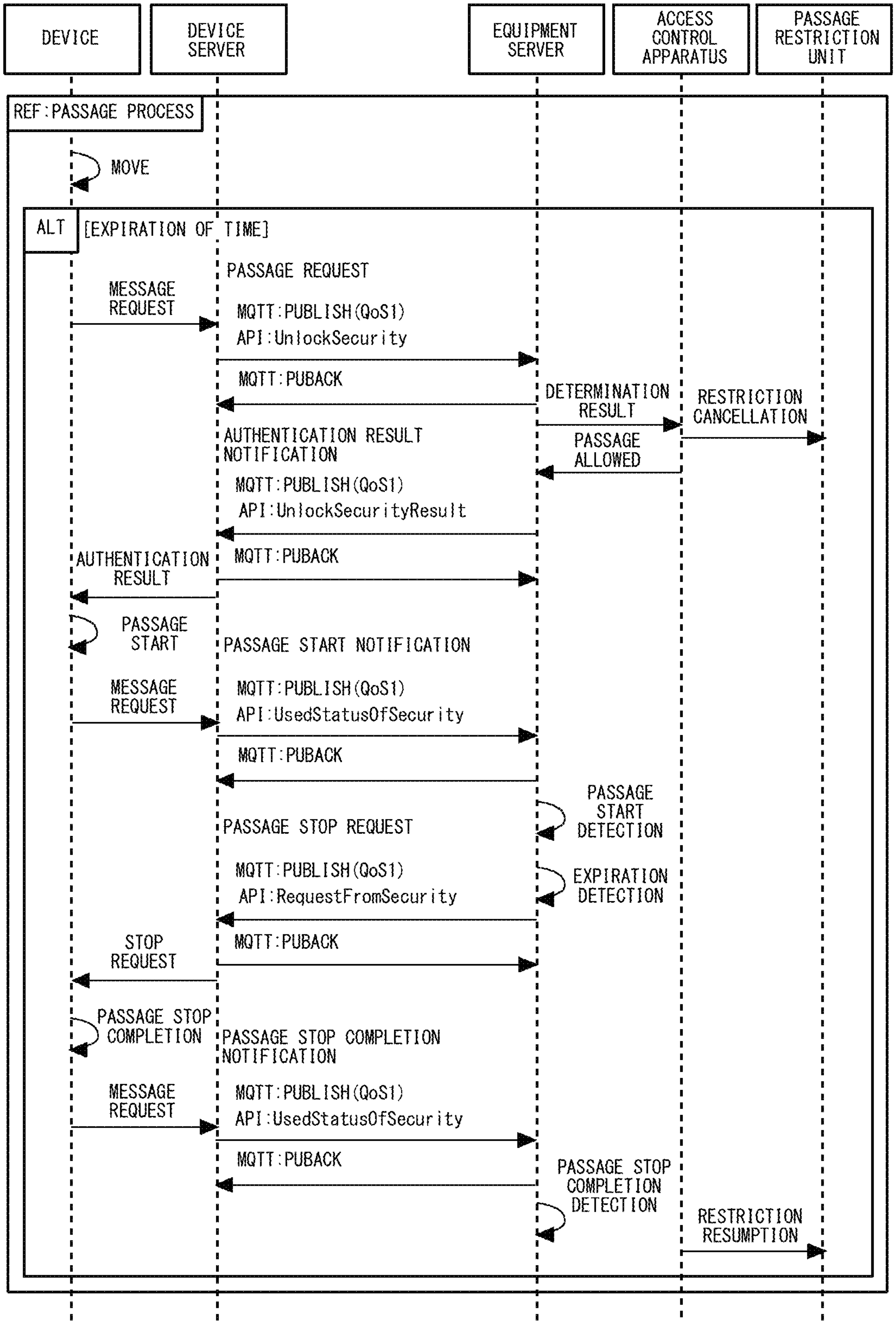
FIG. 10 is a sequence diagram illustrating an example of the action of the communication system according to the first embodiment.

FIG. 10 illustrates an example of a sequence diagram of a case of expiration of a time for passage of the device 3 in the place where the passage restriction unit 7 is provided.

The device 3 which receives the authentication result that passage is allowed starts passage through the place where the passage restriction unit 7 is provided, the passage restriction unit 7 canceling restriction of passage. Here, the device 3 might not be able to quickly perform passage due to an obstacle or the like which is present on the passage route of the device 3, for example.

When the message for notifying that passage is allowed is transmitted to the device server 11 and thereafter the message for notifying the completion of passage is not received from the device server 11 before a time set in advance elapses, the equipment server 10 detects expiration of the time for passage. When expiration of the time for passage of the device 3 is detected, the equipment server 10 transmits the message for requesting the stop of passage to the device server 11. The message for requesting the stop of passage includes the API name for designating a function for a request about security to the device 3 and information which indicates the stop of passage as a kind of the request, for example. The API name is "RequestFromSecurity", or the like, for example. The message is configured to include first layer: Robot, second layer (device specification information): 001, third layer (direction information): B2O, and fourth layer: SecurityInterface in the topic name and to include API (processing information): RequestFromSecurity in the payload, for example. Information of the kind of the request is included in the payload, for example. Here, it is desirable that the time set in advance be a shorter time than the keepalive timer. The time may be a time such as 120 seconds, for example, but is not limited to 120 seconds.

The device control unit 16 transmits information of the request included in the message to the device 3. Subsequently, the device 3 stops passage through the place where the passage restriction unit 7 is provided, the passage restriction unit 7 canceling restriction of passage. The device 3 completes the stop of passage, for example, by moving to turn back to a position away from the place where the passage restriction unit 7 is provided. When the stop of passage is completed, the device 3 requests the corresponding device server 11 to publish the message for notifying the completion of the stop of passage.

The device server 11 which accepts the request transmits the message for notifying the completion of the stop of passage to the equipment server 10.

Based on the information synchronized with the device server 11 such as the position state of the device 3, for example, the equipment server 10 detects the completion of the stop of passage of the device 3 in the place where the passage restriction unit 7 is provided, the passage restriction unit 7 canceling restriction.

Subsequently, the equipment control unit 13 of the equipment server 10 causes the passage restriction unit 7, which has canceled restriction of passage, to resume restriction of passage.

As described above, the communication system 1 according to the first embodiment includes the equipment server 10 and the plural device servers 11. The equipment server 10 includes the first communication unit 12 and the equipment control unit 13. The first communication unit 12 communicates the messages in the common data format with the plural device servers 11. The equipment control unit 13 communicates with the access control system 6 and thereby controls the access control system 6. The access control system 6 includes the plural passage restriction units 7.

The passage restriction units 7 are provided so as to be capable of restricting passage of the plural devices 3 moving in the building 2. Each of the device servers 11 includes the second communication unit 15 and the device control unit 16. The second communication unit 15 communicates the messages in the common data format with the equipment server 10. The device control unit 16 communicates the control signal with at least any of devices 3. The passing device server is any of the plural device servers 11. The passing device server communicates the control signal with the passing device as any of the devices 3. In the passing device server, in a case where the passing device passes through the place where the target passage restriction unit as any of the passage restriction units 7 is provided, the second communication unit 15 transmits the passage message as the message including the device specification information to the equipment server 10. Here, the device specification information is information for specifying the passing device. When the first communication unit 12 receives the passage message from the passing device server, the equipment control unit 13 determines whether or not the passage message is invalid based on the device specification information. The equipment control unit 13 outputs a result of the determination to the access control system 6.

In such a configuration, the access control system 6 and the plural devices 3 cooperate with each other by communication via the equipment server 10 and the device server 11. The equipment server 10 and the device server 11 communicate with each other by a message in a common format. Thus, in terms of communication about cooperation, each of the access control systems 6 applied to one or more buildings 2 is loosely coupled with the plural devices 3. Thus, the access control system 6 applied to the facility and the devices 3 moving in the facility easily act in cooperation regardless of combinations of their kinds, differences in manufacturers, or the like.

Further, the first communication unit 12 receives the message for requesting passage as the passage message from the second communication unit 15 of the passing device server. In this case, the message for requesting passage is transmitted from the device side as an origin point, the device side including the passing device and the passing device server.

In such a configuration, because when the device 3 performs passage, the message for requesting passage is transmitted from the device side as the origin point, the device 3 can quickly move in the building 2.

Further, the passage message includes the target specification information. The target specification information is information for specifying the target passage restriction unit from the plural passage restriction units 7.

In such a configuration, by the passage message, the target passage restriction unit provided at the place through which the passing device passes can easily be specified.

Further, the position information of each of the devices 3 is synchronized between the equipment control unit 13 and the passing device server. By the target specification information included in the passage message, the equipment control unit 13 specifies the target passage restriction unit from the plural passage restriction units 7. Based on whether or not the position of the passing device which is specified by the device specification information included in the passage message is included in the acceptance range which is set in advance while corresponding to the specified target passage restriction unit, the equipment control unit 13 determines whether or not the passage message is invalid.

In such a configuration, it becomes possible to determine that the message for requesting passage through the place where the passage restriction unit 7 is provided, the message being from a position away from the passage restriction unit 7, is an invalid message. Thus, because a request for passage through the passage restriction unit 7 on a route through which passage is actually not performed is determined to be an invalid message, security characteristics of the access control system 6 are further enhanced.

Further, in a case where the equipment control unit 13 determines that the passage message is valid and the device specification information included in the passage message is information which specifies the device 3 having the passage authorization for the place where the specified target passage restriction unit is provided, the first communication unit 12 transmits the message for notifying that passage is allowed to the passing device server. In a case where the equipment control unit 13 determines that the passage message is invalid or a case where the device specification information included in the passage message is not the information which specifies the device 3 having the passage authorization for the place where the specified target passage restriction unit is provided, the first communication unit 12 transmits the message for notifying that passage is not allowed to the passing device server.

In such a configuration, the first communication unit 12 can transmit a determination result about the passage authorization in the access control system 6 to the device server 11 by the message in the common data format. The device server 11 can obtain information about passage permission by the message. Thus, the device server 11 can more certainly perform control of movement or the like of the device 3.

Further, in a case where when the passage message is received, the other device 3 of the passing devices is passing through the place where the target passage restriction unit is provided, the first communication unit 12 transmits the message for notifying that passage is not allowed to the passing device server.

Further, in a case where when the passage message is received, use of the target passage restriction unit is stopped, the first communication unit 12 transmits the message for notifying that passage is not allowed to the passing device server.

In such a configuration, the device server 11 can obtain information about passage permission which corresponds to a situation of the passage restriction unit 7 by the message. Thus, the device server 11 can more certainly perform control of movement or the like of the device 3.

Further, when the message for notifying that passage is allowed is transmitted to the passing device server and thereafter the passing device starts passage through the place where the target passage restriction unit is provided, the first communication unit 12 receives the message for notifying the start of passage from the passing device server.

Further, when the message for notifying that passage is allowed is transmitted to the passing device server and thereafter the passing device completes passage through the place where the target passage restriction unit is provided, the first communication unit 12 receives the message for notifying the completion of passage from the passing device server.

In such a configuration, the equipment server 10 can obtain and notify the passage situation of the device 3 by the message and can thus more certainly perform control of movement or the like of the device 3. Thus, the equipment server 10 can more accurately manage the situation of the device 3 moving in the building 2. Thus, security characteristics of the access control system 6 are further enhanced.

Further, when the message for notifying that passage is allowed is transmitted to the passing device server and thereafter the message for notifying the completion of passage is not received from the passing device server before a time set in advance elapses, the first communication unit 12 transmits the message for requesting a stop of passage to the passing device server. Here, it is desirable that the time set in advance be a shorter time than the keepalive timer. The time may be a time such as 120 seconds, for example, but is not limited to 120 seconds.

Such a configuration can prevent blockage of a movement route in the building 2 due to a stoppage or the like of the device 3 in the place where the passage restriction unit 7 is provided. Accordingly, lowering of movement efficiency of the device 3 in the building 2 can be suppressed.

Further, when the message for requesting the stop of passage is transmitted to the passing device server and thereafter the passing device completes a process for the stop of passage through the place where the target passage restriction unit is provided, the first communication unit 12 receives the message for notifying the completion of the stop of passage from the passing device server.

In such a configuration, the equipment server 10 can obtain and notify the passage situation of the device 3 by the message and can thus more certainly perform control of movement or the like of the device 3. Thus, the equipment server 10 can more accurately manage the situation of the device 3 moving in the building 2. Thus, security characteristics of the access control system 6 are further enhanced.

In this example, the message communicated by the first communication unit 12 includes the direction information which indicates the transmission direction of the message. Here, the data format of the message in the communication system 1 may not include the direction information.

Note that the passage message may not include information which specifies the passage restriction unit 7 through which passage is requested. In this case, for example, in a case where the equipment control unit 13 determines that the passage message is valid, the first communication unit 12 may transmit the message for notifying that passage is allowed to the passing device server. The passage restriction unit 7 which cancels restriction of passage may be specified by the access control system 6 itself, for example. For example, when any of the passage restriction units 7 reads information such as the security ID from the passing device by wireless communication, the access control apparatus 8 may specify the passage restriction unit 7 as the target passage restriction unit.

Further, based on the position information of the passing device specified by the device specification information included in the passage message, the equipment control unit 13 may specify the target passage restriction unit from the plural passage restriction units 7. In this case, based on whether or not the position of the passing device is included in the acceptance range which is set in advance while corresponding to the specified target passage restriction unit, the equipment control unit 13 determines whether or not the passage message is invalid. In this case, the message which is transmitted from the device server 11 and requests passage may not include the target specification information which specifies the passage restriction unit 7.

Further, when the message for notifying that passage is allowed is transmitted to the passing device server and thereafter the message for notifying the start of passage is not received from the passing device server before a time set in advance elapses, the first communication unit 12 transmits the message for requesting the stop of passage to the passing device server. Here, it is desirable that the time set in advance be a shorter time than the keepalive timer. The time may be a time such as 120 seconds, for example, but is not limited to 120 seconds.

Similarly to a case of performing a process due to expiration of the time of the message for notifying the completion of passage, such a configuration can prevent blockage of the movement route in the building 2 due to the stoppage or the like of the device 3 in the place where the passage restriction unit 7 is provided. Accordingly, lowering of movement efficiency of the device 3 in the building 2 can be suppressed.

Further, when the message for requesting the stop of passage is transmitted to the passing device server and thereafter the message for notifying the completion of the stop of passage is not received from the passing device server before a time set in advance elapses, the first communication unit 12 may issue an alarm to an alarm destination which is registered in advance. The alarm destination registered in advance is a management room of the building 2, a base spot for remotely monitoring the building 2, or the like, for example. Here, it is desirable that the time set in advance be a shorter time than the keepalive timer. The time may be a time such as 120 seconds, for example, but is not limited to 120 seconds.

In such a configuration, when there is a possibility that blockage of the movement route in the building 2 occurs due to the stoppage or the like of the device 3 in the place where the passage restriction unit 7 is provided, an alarm is quickly issued. Accordingly, the blockage of the movement route is quickly handled. Accordingly, lowering of movement efficiency of the device 3 in the building 2 can be suppressed.

Further, the equipment control unit 13 may determine whether or not the passage message is invalid only either one of a case where the passing device enters a region and a case where the passing device exits a region. That is, in a case where the passing device passes through the place where the target passage restriction unit is provided from the first side to the second side in the passage direction, the equipment control unit 13 determines whether or not the passage message is invalid. In a case where the passing device passes from the second side to the first side of the place where the target passage restriction unit is provided, the equipment control unit 13 does not determine whether or not the passage message is invalid. Note that the direction of entry or exit of the device 3 is determined based on the position state of the device 3, information included in the message, or the like, for example.

In such a configuration, for example, for the device 3 which exits from a region for which entry and exit are managed, the equipment control unit 13 can skip a process such as a determination about whether the message for requesting passage is invalid.

Accordingly, loads of processing and communication in the access control system 6 are reduced. Note that in this case, the acceptance range corresponding to the passage restriction unit 7 may be a one-side range of only the first side of the passage restriction unit 7.

Further, in a case where the passing device passes from the second side to the first side of the place where the target passage restriction unit is provided, the equipment control unit 13 may cause the access control apparatus 8 or the like of the access control system 6 to store a passage history of the passing device.

In such a configuration, even in a case where the device 3 performs passage in a direction in which a process for a determination is skipped, the access control system 6 can leave the passage history of the device 3 as a log. Accordingly, security characteristics of the access control system 6 are further enhanced.

Further, the first communication unit 12 may communicate the message in the common data format with any of the devices 3. That is, any of the devices 3 may perform direct communication by the message with the equipment server 10.

Further, the equipment control unit 13 may make a determination about the passage authorization, instead of the access control system 6. That is, when the first communication unit 12 receives the passage message from the passing device server, the equipment control unit 13 determines whether or not the device specification information included in the passage message is information which specifies the device 3 having the passage authorization for the place where the specified target passage restriction unit is provided.

Here, in the access control system 6, a tailgating monitoring range which corresponds to each of the passage restriction units 7 may be set in advance. The tailgating monitoring range is a range such as a range which includes the place where the corresponding passage restriction unit 7 is provided or a range in the vicinity of the place where the corresponding passage restriction unit 7 is provided, for example. The tailgating monitoring range is the same range as the acceptance range, for example.

Alternatively, the tailgating monitoring range may be a range which encompasses the acceptance range, for example. The tailgating monitoring range may be a range which does not encompass the acceptance range and a range which is present in a position closer to the corresponding passage restriction unit 7 than the acceptance range, for example.

When plural devices 3 move in cooperation, the plural devices 3 may at once pass through the place where any of the passage restriction units 7 is provided. In such a case, the equipment server 10 may determine that the messages for requesting passage, the message being transmitted from the plural devices 3, are valid only in a case where the plural devices 3 at once pass through the place where the passage restriction unit 7 is provided. That is, the equipment server 10 may determine that the messages for requesting passage from the plural devices 3 are valid only in a case where the plural devices 3 moving in cooperation pass, in a tailgating manner, through the place where the passage restriction unit 7 is provided. Here, for example, when the plural devices 3 simultaneously perform passage in a range of time which is set in advance, the equipment server 10 determines that the plural devices 3 at once perform passage. That is, when the first communication unit 12 receives the passage message from the passing device server, the first communication unit 12 might also receive another message including information specifying the device 3 which is the other device 3 of the passing device and which moves in the place where the same target passage restriction unit is provided. In this case, in a case where both of a position of the passing device and a position of the other device 3 are included in the acceptance range corresponding to the specified target passage restriction unit, the equipment control unit 13 determines that both of the passage message and the other message are valid. In a case where either one of the position of the passing device and the other device 3 is not included in the acceptance range, the equipment control unit 13 determines that both of the passage message and the other message are invalid. Here, it is desirable that the time set in advance be a shorter time than the keepalive timer. The time may be a time such as 120 seconds, for example, but is not limited to 120 seconds.

In such a configuration, the plural devices 3 moving in cooperation can be prevented from being divided by the passage restriction unit 7. Accordingly, an effect of cooperation of the plural devices 3 is more certainly exhibited. Note that a combination of the devices 3 moving in cooperation may be registered in advance in the equipment server 10 or the like. In this case, in a case where the plural devices 3 in a combination which is not registered in advance perform passage in the tailgating manner, the equipment control unit 13 may determine that the messages for requesting passage from the plural devices 3 are invalid. The combination of the devices 3 moving in cooperation is a combination of a traveling robot which performs work on a very uneven floor surface and a walking robot which can transport the traveling robot, for example.

Further, in a case where the plural devices 3 pass, in the tailgating manner, through the place where the passage restriction unit 7 is provided, the equipment server 10 may determine that the messages for requesting passage from the plural devices 3 are invalid. That is, when the first communication unit 12 receives the passage message from the passing device server, the first communication unit 12 might also receive another message including information specifying the device 3 which is the other device 3 of the passing device and which moves in the place where the same target passage restriction unit is provided. In this case, in a case where both of the position of the passing device and the position of the other device 3 are included in the tailgating monitoring range corresponding to the specified target passage restriction unit, the equipment control unit 13 determines that both of the passage message and the other message are invalid. Alternatively, in a case where the position of the other device 3 is included in the tailgating monitoring range corresponding to the specified target passage restriction unit, the equipment control unit 13 may determine that the passage message is invalid. In a case where only the position of the other device 3 is included in the tailgating monitoring range, the equipment control unit 13 may determine that the passage message is invalid. Further, also in a case where the other device does not transmit the message, the equipment control unit 13 may determine that the passage message from the passing device is invalid.

In such a configuration, passage in the tailgating manner by the plural devices 3 is restricted. Accordingly, security characteristics of the access control system 6 are further enhanced. Note that either one or both of the passing device and the other device 3 which performs passage in the tailgating manner with the passing device may be a wireless tag, a portable terminal, or the like which moves in the building 2 while being carried by the user of the building 2. In this case, the position of the device 3 corresponds to a position of the user carrying the device 3. Further, the information specifying the device 3 corresponds to information specifying the user carrying the device 3.

Further, in the above example, the message received by the first communication unit 12 is the passage message, and the equipment control unit 13 determines whether or not the passage message is invalid based on the device specification information and thereby determines whether or not passage of the passing device is invalid. However, in order to solve problems, such a configuration is not restrictive, but it is sufficient that the message received from the device server 11 by the first communication unit 12 is used for an assessment about whether or not passage of the passing device is invalid.

For example, in a case where the device 3 transmits the passage message to the access control apparatus 8 and the first communication unit 12 receives the passage message including the device specification information from the access control apparatus 8, the equipment control unit 13 may assess whether or not passage of the passing device is invalid by combining the other message, which is received from the device server 11 by the first communication unit 12, with the passage message.

More specifically, for example, based on whether or not the device specification information included in the passage message received from the access control apparatus 8 agrees with the device specification information which is registered by the message received in advance from the device server by the first communication unit 12, the equipment control unit 13 may assess whether or not passage of the passing device is invalid. Further, for example, when the first communication unit 12 receives information about the state of the device 3 (such as whether or not transporting a person, for example) from the device server 11 and the device 3 which is specified by the device specification information included in the passage message received from the access control apparatus 8 is in a specific state (such as a state of transporting a person, for example), the equipment control unit 13 may assess that passage of the passing device is invalid.

In addition, for example, in a case where the first communication unit 12 receives the passage message, which does not include the device specification information, from the access control apparatus 8, the equipment control unit 13 may assess whether or not passage of the passing device is invalid by the other message received from the device server 11 by the first communication unit 12.

More specifically, the equipment server 10 may be one in which in a case where the device 3 uses an IC card or the like to transmit a request to go through the place where the passage restriction unit 7 is provided to the access control apparatus 8, the first communication unit 12 receives, from the access control apparatus 8, the fact that a request is made that the device 3 or a person go through the place where the passage restriction unit 7 is provided. For example, in a case where the first communication unit 12 receives the request from the access control apparatus 8, the first communication unit 12 may receive the message indicating the position of the device 3 from the device server 11, and the equipment control unit 13 may assess whether or not passage of the passing device is invalid based on whether or not the device 3 registered in advance is present in an area set in advance around the place where the passage restriction unit 7 is provided.

Further, the device specification information does not necessarily have to uniquely specify the passing device. The device specification information may indicate a type of the passing device, for example. The device specification information may indicate a manufacturer, a maker, or the like of the passing device, for example. Specifically, a layer which indicates a device management ID may be provided in a portion such as a portion between the first layer and the second layer of the message. The device management ID is information which indicates an ID of a robot maker managing the device ID. In this case, at least a part of the layers of the message may be used as the device specification information.

Next, a description will be made about an example of a hardware configuration of the communication system 1 by using FIG. 11.

Figure 11:
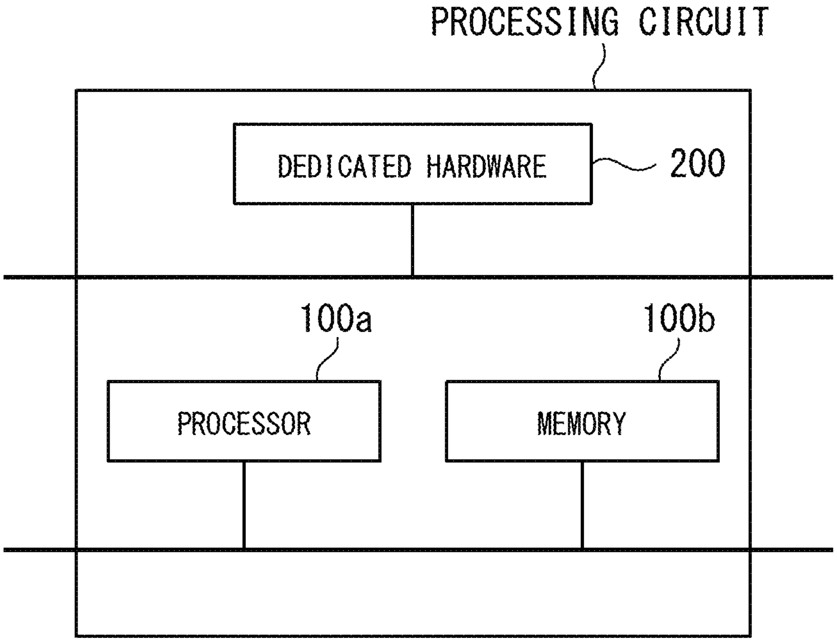
FIG. 11 is a hardware configuration diagram of a main part of the communication system according to the first embodiment.

FIG. 11 is a hardware configuration diagram of a main part of the communication system 1 according to the first embodiment.

Each function of the communication system 1 can be realized with a processing circuit. The processing circuit includes at least one processor 100*a* and at least one memory 100*b*. The processing circuit may include at least one piece of dedicated hardware 200 together with the processor 100*a* and the memory 100*b* or instead of those.

In a case where the processing circuit includes the processor 100*a* and the memory 100*b*, each function of the communication system 1 is realized as software, firmware, or a combination of software and firmware. At least one of the software and the firmware is described as a program. The program is stored in the memory 100*b*. The processor 100*a* realizes each function of the communication system 1 by reading out and executing the program stored in the memory 100*b*.

The processor 100*a* is also referred to as CPU (Central Processing Unit), processing device, arithmetic operation device, microprocessor, microcomputer, or DSP.

The memory 100*b* is configured with a non-volatile or volatile semiconductor memory such as a RAM, a ROM, a flash memory, an EPROM, or an EEPROM, for example.

In a case where the processing circuit includes the dedicated hardware 200, the processing circuit is realized with a single circuit, a composite circuit, a processor formed as a program, a processor formed as a parallel program, an ASIC, an FPGA, or a combination of those, for example.

Each function of the communication system 1 can be realized with a processing circuit. Alternatively, functions of the communication system 1 can integrally be realized with a processing circuit. As for the functions of the communication system 1, a part of those may be realized with the dedicated hardware 200, and the other parts may be realized with software or firmware. In such a manner, the processing circuit realizes each function of the communication system 1 by the dedicated hardware 200, software, firmware, or a combination of those.

Note that a part or all of functions of each of the servers such as the equipment server 10 and the device server 11 of the communication system 1, the access control apparatus 8, and so forth may be implemented by resources or the like for storages or processes on a cloud service.

Second Embodiment

A particularly detailed description will be made about points in a second embodiment which are different from examples disclosed in the first embodiment. As for characteristics which will not be described in the second embodiment, any of characteristics of the examples disclosed in the first embodiment may be employed.

Figure 12:
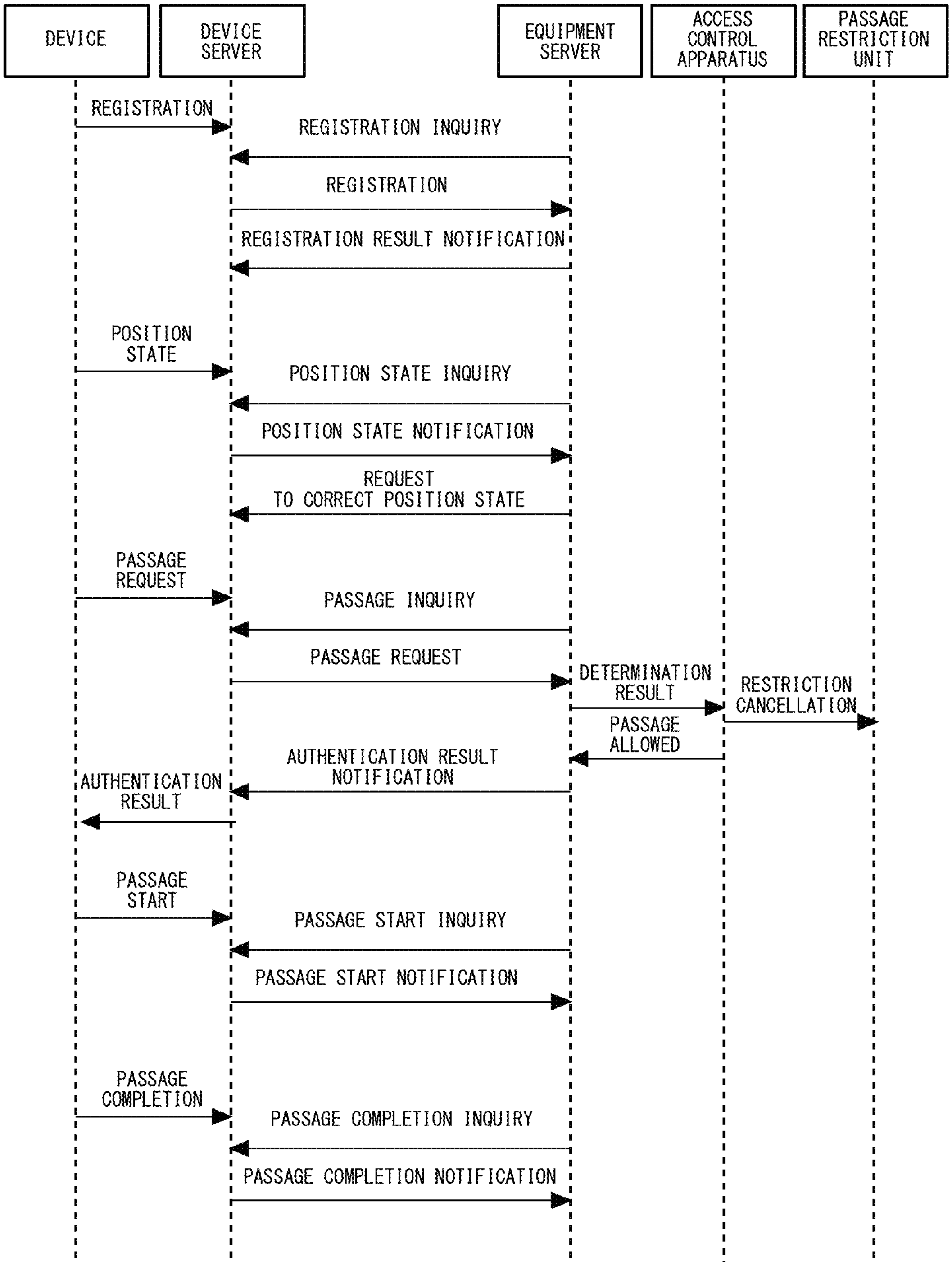
FIG. 12 is a sequence diagram illustrating an example of an action of the communication system according to a second embodiment.

FIG. 12 is a sequence diagram illustrating an example of an action of the communication system 1 according to the second embodiment.

In this example, for example, when the device server 11 accepts a request for transmission of a message from the corresponding device 3, the device server 11 accumulates and stores information of the request. When the device server 11 receives a query by polling which is periodically transmitted from the equipment server 10, for example, the device server 11 transmits the information of the request which is accumulated and stored, to the equipment server 10. In this case, the equipment server 10 and the device server 11 may perform communication of the message by another protocol than the MQTT.

The first communication unit 12 of the equipment server 10 transmits a message for inquiring whether or not the initial registration of the device 3 is performed to each of the device servers 11, for example, at periodic intervals. In a case where the device 3 which performs the initial registration is present, the second communication unit 15 of the device server 11 which receives the message transmits a message, which includes information of the device 3, as an answer to the equipment server 10.

The first communication unit 12 of the equipment server 10 transmits a message for inquiring the position state of the device 3 to each of the device servers 11, for example, at periodic intervals. The second communication unit 15 of the device server 11 which receives the message transmits a message, which notifies the position state of the corresponding device 3, as the answer to the equipment server 10. Subsequently, the first communication unit 12 transmits a message, which requests correction of the position state of the device 3 corresponding to the device server 11 which has transmitted the message for notifying the position state, to the device server 11.

The first communication unit 12 of the equipment server 10 transmits a message for inquiring whether or not passage through the place where the passage restriction unit 7 is provided is performed to each of the device servers 11, for example, at periodic intervals. In a case where the device 3 which performs passage is present, the second communication unit 15 of the device server 11 which receives the message transmits a message, which requests passage of the device 3, as the answer to the equipment server 10.

The equipment control unit 13 of the equipment server 10 determines whether or not the message, which is received from the device server 11 and requests passage of the device 3, is invalid. The equipment control unit 13 outputs a result of the determination to the access control system 6. Subsequently, the equipment control unit 13 obtains an authentication result such as a determination result about passage permission of the device 3 from the access control system 6. The first communication unit 12 transmits a message, which notifies the authentication result about the device 3, to the device server 11 corresponding to the device 3.

The device control unit 16 of the device server 11 transmits information of the notified authentication result to the device 3. Subsequently, the device 3 starts passage through the place where the passage restriction unit 7 is provided, the passage restriction unit 7 canceling restriction of passage. When passage is started, the device 3 requests the corresponding device server 11 to publish a message for notifying a start of passage. The device 3 waits for an instruction from the device control unit 16 in front of the passage restriction unit 7, for example.

The first communication unit 12 of the equipment server 10 transmits a message for inquiring whether or not the start of passage is performed to each of the device servers 11, for example, at periodic intervals. In a case where the device 3 which waits for the start of passage is present, the second communication unit 15 of the device server 11 which receives the message transmits a message, which notifies the start of passage of the device 3, as the answer to the equipment server 10.

Subsequently, the device 3 completes passage through the place where the passage restriction unit 7 is provided, the passage restriction unit 7 canceling restriction of passage. When passage is completed, the device 3 requests the corresponding device server 11 to publish a message for notifying completion of passage.

The first communication unit 12 of the equipment server 10 transmits a message for inquiring whether or not the completion of passage is performed to each of the device servers 11, for example, at periodic intervals. In a case where the device 3 which performs the completion of passage is present, the second communication unit 15 of the device server 11 which receives the message transmits a message, which notifies the completion of passage of the device 3, as the answer to the equipment server 10.

As described above, in the equipment server 10 of the communication system 1 according to the second embodiment, the first communication unit 12 transmits the message, which inquires whether or not passage through the place where the passage restriction unit 7 is provided is performed, to each of the device servers 11. The first communication unit 12 receives a message, which is an answer of the passing device server to the message of query and indicates passage of the passing device, as the passage message.

In such a configuration, the communication system 1 can be applied to a system including the device 3 whose functions are limited such as the device 3 which does not have a function for making a request while setting the device 3 itself as an origin point.

INDUSTRIAL APPLICABILITY

A communication system according to the present disclosure can be applied to cooperation between an access control system applied to a facility and devices moving in the facility. An equipment server and a device server according to the present disclosure can be applied to the communication system. A data structure according to the present disclosure can be applied to communication in the communication system.

REFERENCE SIGNS LIST

1 Communication system, 2, 2*a*, 2*b* Building, 3, 3*p*, 3*q* Device, 4 Communication network, 5 Base station, 6, 6*a*, 6*b* Access control system, 7 Passage restriction unit, 8 Access control apparatus, 9 Communication apparatus, 10, 10*a*, 10*b* Equipment server, 11, 11*p*, 11*q* Device server, 12 First communication unit, 13 Equipment control unit, 14 Management unit, 15 Second communication unit, 16 Device control unit, 100*a* Processor, 100*b* Memory, 200 Dedicated hardware

The invention claimed is:

1. An equipment server comprising:

first processing circuitry to communicate a message in a common data format with plural device servers which communicate a control signal with at least any one device among plural devices moving in a facility; and to control equipment in the facility based on a received message, wherein the equipment includes one or more passage restriction barriers which are provided in the facility so as to be capable of restricting passage of the plural devices when a passing device among the plural devices, the passing device communicating a control signal with a passing device server which is any one of the plural device servers, passes through a place where a target passage restriction barrier is provided, the target passage restriction barrier being one of the one or more passage restriction barriers, the first processing circuitry determines whether or not a passage message is invalid based on the passage message, which is the received message, and outputs an authentication request, when the passage message is determined to be valid, to an access control system which includes the one or more passage restriction barriers.

2. The equipment server according to claim 1, wherein the first processing circuitry outputs a result of the determination to the access control system.

3. The equipment server according to claim 1, wherein the first processing circuitry determines whether or not the passing device has passage authorization instead of outputting the authentication request to the access control system when the passage message is determined to be valid.

4. The equipment server according to claim 1, wherein the first processing circuitry skips outputting of the authentication request to the access control system when the passage message is determined to be invalid.

5. The equipment server according to claim 1, wherein the passage message which is received from the passing device server includes device specification information which specifies the passing device, and when the first processing circuitry receives the passage message from the passing device server, the first processing circuitry determines whether or not the passage message is invalid based on the device specification information and outputs a result of the determination to the access control system which includes the one or more passage restriction barriers.

6. The equipment server according to claim 1, wherein the first processing circuitry receives a message for requesting passage as the passage message from the passing device server.

7. The equipment server according to claim 1, wherein the first processing circuitry transmits a message for inquiring whether or not passage through a place where any one of the one or more passage restriction barriers is provided is performed to each of the plural device servers and receives a message, which is an answer of the passing device server to the message of query and indicates passage of the passing device, as the passage message.

8. The equipment server according to claim 1, wherein in a case where plural passage restriction barriers are provided as the one or more passage restriction barriers in the facility, the passage message includes target specification information which specifies the target passage restriction barrier from the plural passage restriction barriers.

9. The equipment server according to claim 1, wherein position information of each of the plural devices is synchronized between the first processing circuitry and the passing device server, and the first processing circuitry specifies the target passage restriction barrier from the plural passage restriction barriers by the target specification information included in the passage message and determines whether or not the passage message is invalid based on whether or not a position of the passing device which is specified by device specification information included in the passage message is included in an acceptance range which is set in advance while corresponding to the specified target passage restriction barrier.

10. The equipment server according to claim 1, wherein in a case where plural passage restriction barriers are provided as the one or more passage restriction barriers in the facility, position information of each of the plural devices is synchronized between the first processing circuitry and the passing device server, and the first processing circuitry specifies the target passage restriction barrier from the plural passage restriction barriers based on the position information of the passing device which is specified by device specification information included in the passage message and determines whether or not the passage message is invalid based on whether or not a position of the passing device is included in an acceptance range which is set in advance while corresponding to the specified target passage restriction barrier.

11. The equipment server according to claim 1, wherein in a case where the first processing circuitry determines that the passage message is valid and the passing device has passage authorization for a place where the target passage restriction barrier is provided, the first processing circuitry transmits a message for notifying that passage is allowed to the passing device server, and in a case where the first processing circuitry determines that the passage message is invalid or a case where the passing device does not have the passage authorization for the place where the target passage restriction barrier is provided, the first processing circuitry transmits a message for notifying that passage is not allowed to the passing device server.

12. The equipment server according to claim 11, wherein in a case where when the passage message is received, another device of the passing device among the plural devices is passing through the place where the target passage restriction barrier is provided, the first processing circuitry transmits the message for notifying that passage is not allowed to the passing device server.

13. The equipment server according to claim 11, wherein in a case where when the passage message is received, use of the target passage restriction barrier is stopped, the first processing circuitry transmits the message for notifying that passage is not allowed to the passing device server.

14. The equipment server according to claim 11, wherein when the passing device starts passage through the place where the target passage restriction barrier is provided after the message for notifying that passage is allowed is transmitted to the passing device server, the first processing circuitry receives a message for notifying a start of passage from the passing device server.

15. The equipment server according to claim 14, wherein when the message for notifying the start of passage is not received from the passing device server before a time set in advance elapses after the message for notifying that passage is allowed is transmitted to the passing device server, the first processing circuitry transmits a message for requesting a stop of passage to the passing device server.

16. The equipment server according to claim 14, wherein when the passing device completes passage through the place where the target passage restriction barrier is provided after the message for notifying that passage is allowed is transmitted to the passing device server, the first processing circuitry receives a message for notifying completion of passage from the passing device server.

17. The equipment server according to claim 16, wherein when the message for notifying the completion of passage is not received from the passing device server before a time set in advance elapses after the message for notifying that passage is allowed is transmitted to the passing device server, the first processing circuitry transmits a message for requesting a stop of passage to the passing device server.

18. The equipment server according to claim 15, wherein when the passing device completes a process for the stop of passage through the place where the target passage restriction barrier is provided after the message for requesting the stop of passage is transmitted to the passing device server, the first processing circuitry receives a message for notifying completion of the stop of passage from the passing device server.

19. The equipment server according to claim 18, wherein when the message for notifying the completion of the stop of passage is not received from the passing device server before a time set in advance elapses after the message for requesting the stop of passage is transmitted to the passing device server, the first processing circuitry issues an alarm to an alarm destination which is registered in advance.

20. The equipment server according to claim 1, wherein in a case where the passing device passes through the place where the target passage restriction barrier is provided from a first side to a second side in a passage direction, the first processing circuitry determines whether or not the passage message is invalid, and in a case where the passing device passes from the second side to the first side of the place where the target passage restriction barrier is provided, the first processing circuitry does not determine whether or not the passage message is invalid.

21. The equipment server according to claim 20, wherein in a case where the passing device passes from the second side to the first side of the place where the target passage restriction barrier is provided, the first processing circuitry causes the access control system to store a passage history of the passing device.

22. The equipment server according to claim 1, wherein the first processing circuitry communicates a message in the data format with at least any one of the plural devices.

23. The equipment server according to claim 1, wherein in accordance with whether or not device specification information, which is included in the passage message and specifies the passing device, is information which specifies the device having the passage authorization for a place where the target passage restriction barrier is provided, the target passage restriction barrier being specified from the plural passage restriction barriers, the first processing circuitry determines whether or not the passing device has the passage authorization for the place where the target passage restriction barrier is provided.

24. The equipment server according to claim 9, wherein when the first processing circuitry receives the passage message from the passing device server, the first processing circuitry receives another message including information which specifies another device than the passing device among the plural devices, the other device moving in the place where the target passage restriction barrier is provided, the first processing circuitry determines that both of the passage message and the other message are valid in a case where both of a position of the passing device and a position of the other device are included in the acceptance range corresponding to the specified target passage restriction barrier, and the first processing circuitry determines that both of the passage message and the other message are invalid in a case where either one of the position of the passing device and the position of the other device is not included in the acceptance range.

25. The equipment server according to claim 9, wherein when the first processing circuitry receives the passage message from the passing device server, the first processing circuitry receives another message including information which specifies another device than the passing device among the plural devices, the other device moving in the place where the target passage restriction barrier is provided, the first processing circuitry determines that the passage message is invalid in a case where a position of the other device is included in a tailgating monitoring range which is set in advance while corresponding to the specified target passage restriction barrier.

26. The equipment server according to claim 9, wherein when the first processing circuitry receives the passage message from the passing device server, the first processing circuitry receives another message including information which specifies a user in addition to the passing device among the plural devices, the user moving in the place where the target passage restriction barrier is provided, the first processing circuitry determines that both of the passage message and the other message are invalid in a case where both of a position of the passing device and a position of the user are included in a tailgating monitoring range which is set in advance while corresponding to the specified target passage restriction barrier.

27. The equipment server according to claim 1, wherein the first processing circuitry receives a message for requesting registration from the passing device server and transmits a message for notifying a result of the registration for the message to the passing device server.

28. The equipment server according to claim 1, wherein the first processing circuitry receives a message for notifying a position state of the passing device from the passing device server.

29. The equipment server according to claim 28, wherein the first processing circuitry transmits a message for requesting correction of the position state of the passing device to the passing device server.

30. The equipment server according to claim 1, wherein a message communicated by the first processing circuitry includes direction information which indicates a transmission direction of the message.

31. A device server comprising:

second processing circuitry to communicate a message in a common data format with an equipment server communicating with an access control system including one or more passage restriction barriers which are provided in a facility so as to be capable of restricting passage of plural devices moving in the facility; and to communicate a control signal with a passing device which is any one of the plural devices based on a received message, wherein in a case where the passing device passes through a place where a target passage restriction barrier as one of the one or more passage restriction barriers is provided, the second processing circuitry transmits a passage message, which is a message in the common data format, to the equipment server such that the equipment server is capable of outputting an authentication request to the access control system when the equipment server determines whether or not the passage message is invalid based on the passage message and the passage message is determined to be valid.

32. The device server according to claim 31, wherein the second processing circuitry transmits the passage message to the equipment server such that the equipment server is capable of outputting a result of the determination to the access control system.

33. The device server according to claim 31, wherein the equipment server determines whether or not the passing device has passage authorization instead of outputting the authentication request to the access control system when the passage message is determined to be valid.

34. A communication system comprising:

an equipment server; and plural device servers, wherein the equipment server includes first processing circuitry to communicate a message in a common data format with the plural device servers and to control one or more passage restriction barriers which are provided in a facility so as to be capable of restricting passage of plural devices moving in the facility, each of the plural device servers includes second processing circuitry to communicate a message in the data format with the equipment server and to communicate a control signal with at least any device of the plural devices, in a passing device server among the plural device servers which communicates a control signal with a passing device as any one of the plural devices, the second processing circuitry transmits a passage message, which is a message in the common data format, to the equipment server in a case where the passing device passes through a place where a target passage restriction barrier as one of the one or more passage restriction barriers is provided, and when the first processing circuitry receives the passage message from the passing device server, the first processing circuitry determines whether or not the passage message is invalid based on the passage message and outputs an authentication request, when the passage message is determined to be valid, to an access control system including the one or more passage restriction barriers.

35. The communication system according to claim 34, wherein the first processing circuitry outputs a result of the determination to the access control system.

36. The communication system according to claim 34, wherein the first processing circuitry determines whether or not the passing device has passage authorization instead of outputting the authentication request to the access control system when the passage message is determined to be valid.

* * * * *